US006311947B1

(12) United States Patent
Foster

(10) Patent No.: US 6,311,947 B1
(45) Date of Patent: Nov. 6, 2001

(54) VALVE ASSEMBLY

(76) Inventor: Raymond Keith Foster, 401 NW. Adler, Madras, OR (US) 97741

( * ) Notice: Subject to any disclaimer, the term of this patent is extended or adjusted under 35 U.S.C. 154(b) by 0 days.

(21) Appl. No.: 09/587,009

(22) Filed: Jun. 5, 2000

Related U.S. Application Data

(62) Division of application No. 09/460,640, filed on Dec. 14, 1999, now Pat. No. 6,209,580.

(51) Int. Cl.$^7$ .................................................. F16K 31/363
(52) U.S. Cl. ........................................ 251/43; 137/596.12
(58) Field of Search .......................... 137/596.12; 251/43

(56) References Cited

U.S. PATENT DOCUMENTS 3,225,781 * 12/1965 Kruger et al. .............. 137/596.13 X
3,498,037 * 3/1970 Hobson et al. .................... 251/43 X
3,903,787 * 9/1975 Kroth et al. ................ 137/596.12 X

FOREIGN PATENT DOCUMENTS

740318 * 11/1955 (GB) ............................... 137/596.13

* cited by examiner

*Primary Examiner*—Gerald A. Michalsky
(74) *Attorney, Agent, or Firm*—Delbert J. Barnard

(57) ABSTRACT

An on/off valve (O/OV) and directional valves (DV1, DV2) are packaged with a switching valve system (10) in a housing assembly (156, 157, 158, 160). The on/off valve (O/OV) is operated by a control handle (154) that is located at one end of the housing assembly (156, 157, 158, 160). The direction control valves (DV1, DV2) are operated by a handle (141) located at the opposite end of the housing assembly (156, 157, 158, 160). The control handles (154, 141) operate to position cams (152, 136, 138) which function to help position valve plugs. In a second embodiment, the handle (141) and cams (136, 138) for controlling the directional valves (DV1, DV2) are replaced by a solenoid valve system (SV2) . A second solenoid valve (SV1) is added to the control system for the off/on valve (O/OV). The solenoid valve (SV1, SV2) allow for a remote positioning of the controls for the off/on and directional valves (O/OV, DV1, DV2). The handles and cams (141, 154, 136, 138, 152) provide for a compact positioning of the controls at one location requiring utilization of a single compact valve housing assembly (156, 157, 158, 160).

2 Claims, 14 Drawing Sheets

FIG. 3
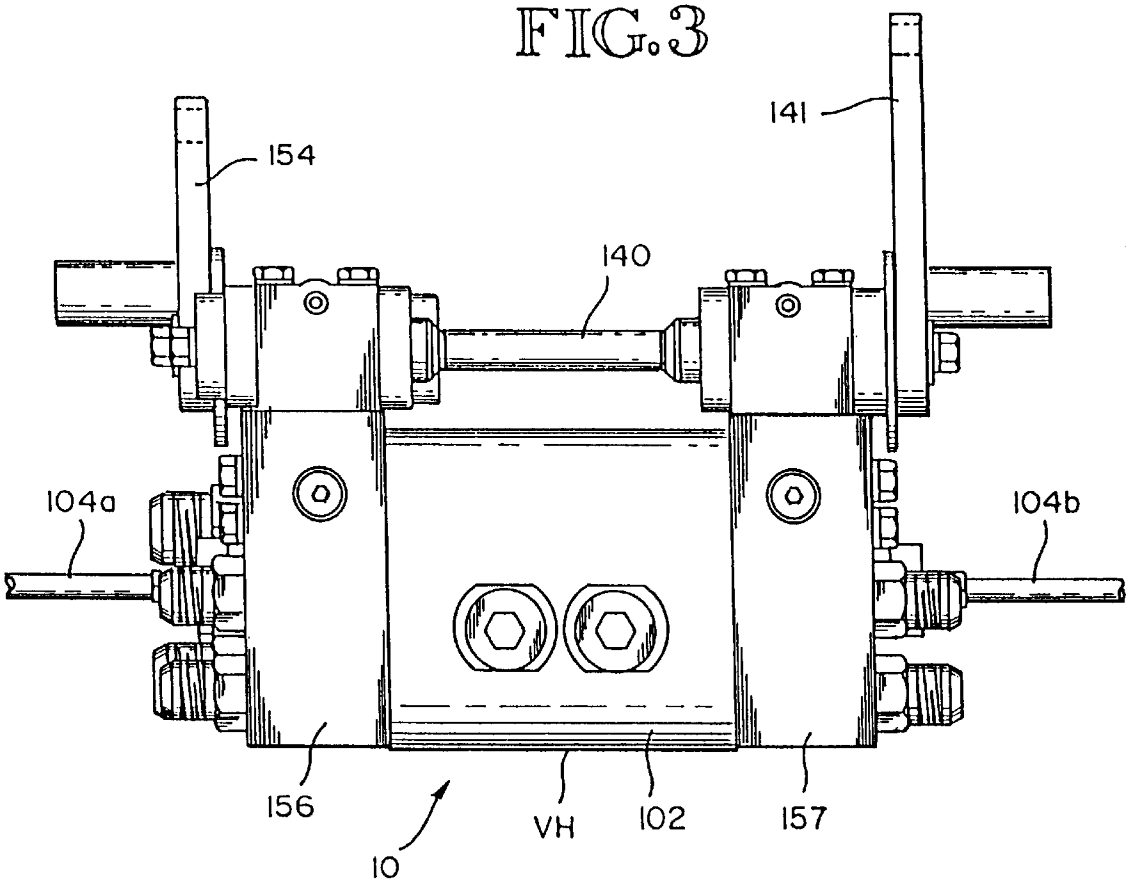
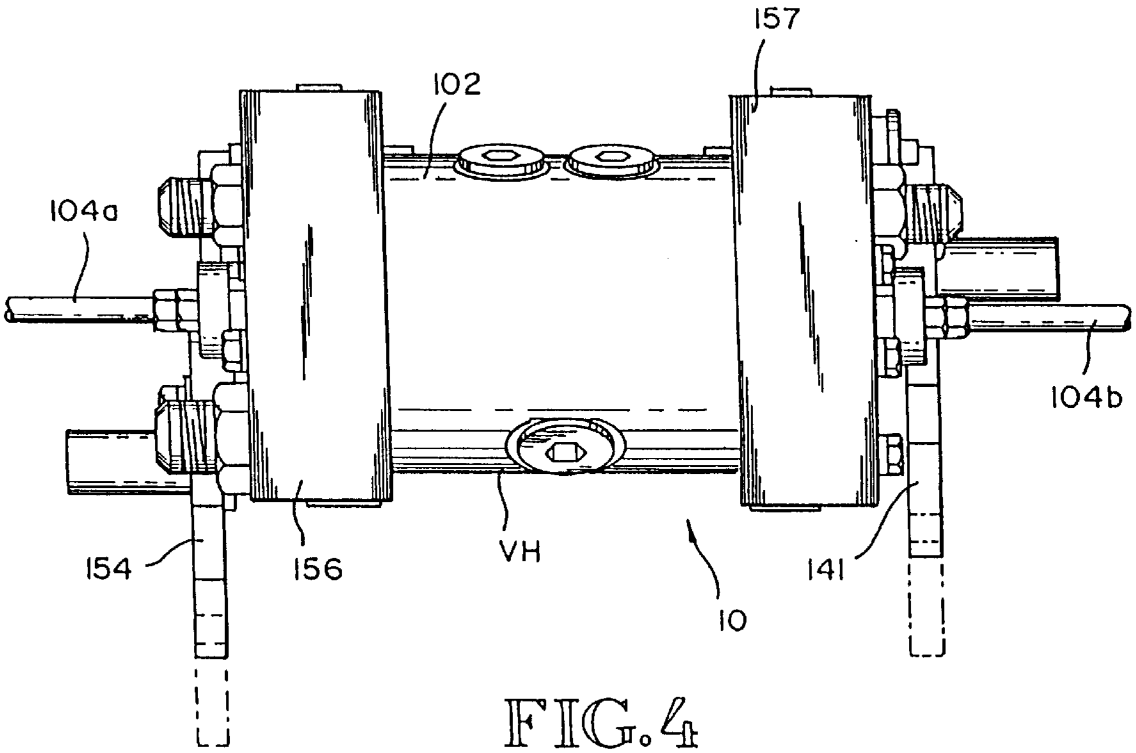
FIG. 4

FIG. 7
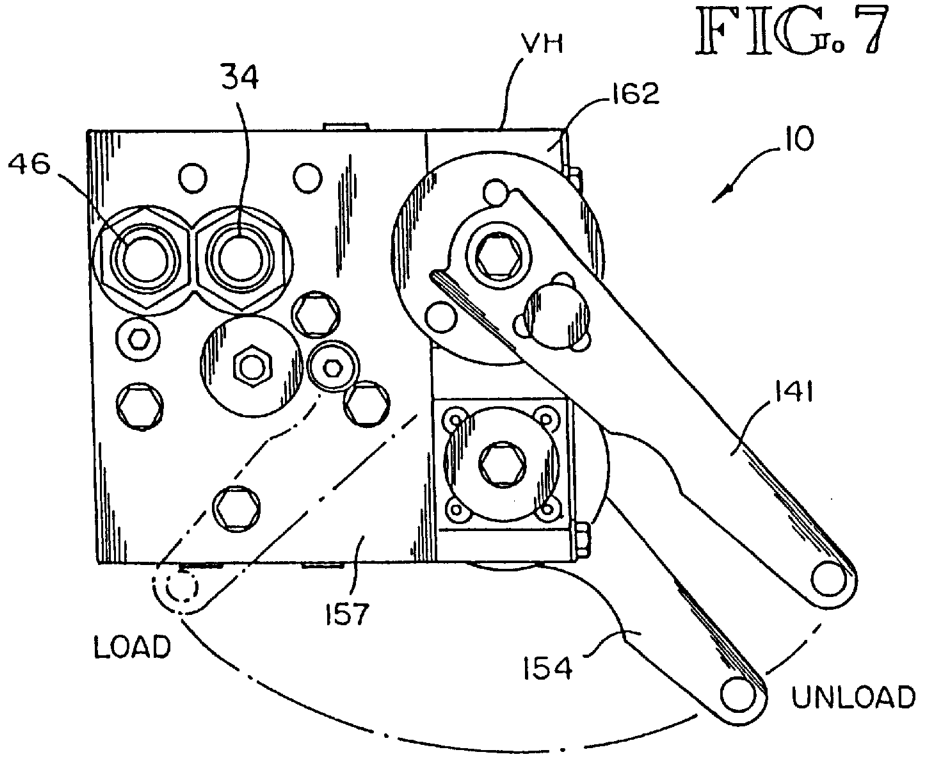
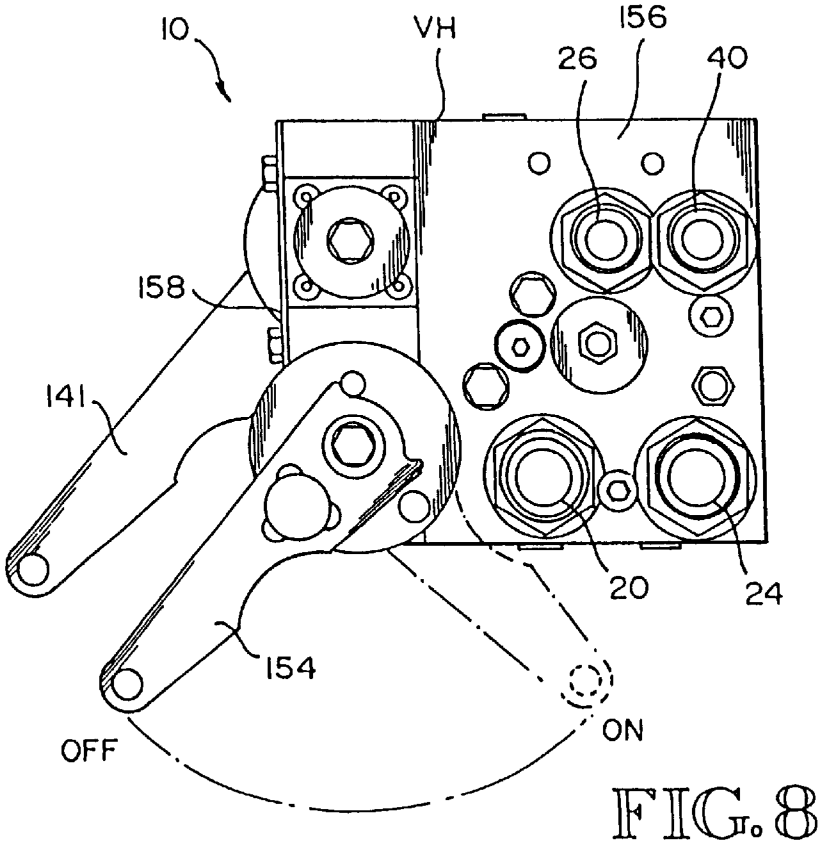
FIG. 8

VALVE ASSEMBLY

RELATED APPLICATION

This is a division of my application Ser. No. 09/460,640, filed Dec. 14, 1999, and entitled Multi-Function Valve Assembly, now U.S. Pat. No. 6,209,580.

TECHNICAL FIELD

This invention relates to valve assemblies for use in hydraulic power systems for controlling reversible piston-cylinder drive units or the like. More particularly, it relates to the provision of an improved valve assembly which combines together a switching valve, an off-on valve and a directional valve. The invention also relates to various subassemblies, components and features of the valve assembly.

BACKGROUND INFORMATION

I own many patents relating to various aspect of reciprocating slat conveyors. Such patents include U.S. Pat. No. 4,712,467, granted Dec. 15, 1987, and entitled, Combined Linear Hydraulic Motor And Transfer Valve; U.S. Pat. No. 4,793,469, granted Dec. 27, 1988 and entitled Reduced Size Drive/Frame Assembly For A Reciprocating Floor Conveyor; U.S. Pat. No. 4,821,868, granted Apr. 18, 1989 and entitled, Drive/Frame Assembly For A Reciprocating Floor; U.S. Pat. No. 5,103,866, granted Apr. 14, 1992, and entitled, Poppet Valve And Valve Assemblies Utilizing Same; U.S. Pat. No. 5,193,661, granted Mar. 16, 1993, and entitled, System Of Linear Hydraulic Motors; U.S. Pat. No. 5,361,679, granted Nov. 8, 1994, and entitled, Directional Control Valve With Pilot Operated Poppet Valve; and U.S. Pat. No. 5,622,095, granted Apr. 22, 1997, and entitled, Hydraulic Drive And Control System. The valve assembly of the present invention is particularly suited for use with reciprocating slat conveyors but it is believed to also have general utility.

The reciprocating slat conveyors disclosed by U.S. Pat. Nos. 4,712,467; 4,821,868 and 5,622,095 operate on what has been described the 1-2-3 cycle. This cycle is illustrated and described in my U.S. Pat. No. 4,793,469, with reference to FIGS. 2–6 in that patent. The conveyor is composed of slats that are divided into "sets" and "groups". In a typical conveyor, there are twenty-four slats divided into three "sets" and eight "groups." Each "group" consists of one slat from each "set." Starting from one side of the conveyor, and moving inwardly, the first "group" of slats is composed of one slat from "set 1", then one slat from "set 2", and then one slat from "set 3." The next "group" ("group 2") repeats this pattern and the pattern is repeated all the way across the conveyor, from "group 1" to "group 8."

FIG. 2 of U.S. Pat. No. 4,793,469, shows all of the conveyor slats in a retracted position in which common ends are aligned at a start station a. A load L is shown centrally positioned on the conveyor. FIG. 3 of that patent shows all of the conveyor slats being advanced together to move the load L forwardly. Movement continues until the opposite end of the conveyor slats are moved to a fully advanced position b. FIG. 4 shows the "set 1" slats being retracted while the "set 2" and "set 3" slats are held stationary. The load does not move because the frictional forces exerted on it by the stationary "set 2" and "set 3" slats are larger than the frictional forces exerted on it by the retracting "set 1" slats. FIG. 5 shows the next step in the sequence. The retracted "set 1" slats and the advanced "set 3" slats are held stationary while the "set 2" slats are being retracted. Again, the load L does not move. FIG. 6 shows retracted "set 1" and the "set 2" slats stationary and the "set 3" slats being retracted. Again, the load L does not move. In this example, the load L is moved a distance equal to the endwise movement of the slats, viz. a–c or d–b.

U.S. Pat. Nos. 4,712,467; 4,821,868, and 5,622,095 disclose a popular style of drive assembly for reciprocating slat conveyors. Each set of slats is connected to a separate transverse drive beam. Thus, in the example given above, there are three transverse drive beams. Each transverse drive beam is connected to a reversible linear hydraulic motor. The control system for the linear hydraulic motor includes a reversing valve, an on/off valve and a directional valve. The reversing valve is also quite commonly referred to as a switching valve. Example reversing valves are disclosed in the aforementioned U.S. Pat. Nos. 5,103,866; 5,193,661; 5,361,679 and 5,622,095. A typical on/off valve is designated OOV in U.S. Pat. No. 5,193,661. A typical direction control valve is designated DCV in U.S. Pat. No. 5,193,661.

A problem in existing systems is that the switching valve, the on/off valve and the direction control valve are separate valves that are spaced apart and connected together by conduits. This results in the system having a large number of conduits. The number of conduits dictates the overall space requirements for the system. The use of separate valves connected by conduits also can result in a positioning of the valves to where one or more of them are not be readily accessible.

There is a need for an approved assembly of the three valves in which the amount of tubing is minimized and the three valves are grouped close together and are rendered accessible to a user. It is a principal object of the invention to fill this need and provide such a valve assembly.

DISCLOSURE OF THE INVENTION

A valve assembly of the present invention includes a switching valve in a valve housing. The valve housing includes a pressure port, a pressure passageway leading from the pressure port to the switching valve, a return port, a return passageway leading from the switching valve to the return port, a first inlet/outlet port, a first in/out passageway leading from the switching valve to the first in/out port, a second in/out port and second in/out passageway leading from the switching valve to the second in/out port. The switching valve has first position in which the pressure passageway is connected to the first in/out passageway and the second in/out passageway is connected to the return passageway. The switching valve also has a second position in which the pressure passageway is connected to the second in/out passageway and the first in/out passageway is connected to the return passageway. A shunt passageway in the valve housing extends between the pressure passageway and the return passageway at a location between the pressure and return ports and the switching valve. A off/on valve in said housing includes a valve plug movable into the shunt passageway, to close the shunt passageway. It is also movable out from the shunt passageway, to open the shunt passageway. When the shunt passageway is closed, pressure at the pressure port is connected to the pressure passageway leading to the switching valve and the switching valve is connected by the return passageway to the return port. When the shunt passageway is open, pressure at the pressure port is shunted away from the switching valve to and through the shunt passageway and to the return passageway and the return port.

Preferably; the valve housing includes a valve seat surrounding the shunt passageway, generally where it meets the return passageway. The valve plug has a plug end facing the valve seat and an opposite rear end. The valve plug is movable axially to move the plug end into and out from a closed position on the valve seat.

In one embodiment, the housing includes a cam passageway rearwardly of the valve plug. A cam in said cam passageway is rotatable between first and second positions. The cam is operatively connected to the rear end of the valve plug and is adapted to permit rearward movement of the valve plug into its open position when the cam is in its first position. Movement of the cam from its first position to its second positions imposes an axial force on the valve plug, moving the valve plug into its closed position.

In one embodiment, the valve plug includes an axial passageway. When the valve plug is seated, and the cam is in its second position, pressure in the pressure passageway is connected by the axial passageway in the valve plug to a region rearwardly of the valve plug where at it exerts and axial force on the valve plug, urging it towards a seated position.

In this embodiment, the cam may include a vent passageway that is blocked when the cam is in its second position and which connects the region rearwardly of the valve plug with return when the cam is in its first position. The housing may include a piston chamber between the rear end of the valve plug and the cam. The piston chamber includes a piston having a rear end that contacts the cam. A compression spring is positioned between the rear end of the valve plug and the piston.

In the preferred embodiment, the valve housing comprises a housing central portion sandwiched between two housing end portions. The switching valve is located within the central portion. The pressure port, the return port, the shunt passageway, the off/on valve and at least one on/off port is apart of one of the end portions. The other end portion includes at least one on/off port. The housing may include an auxiliary housing member that is attached to the first end portion, rearwardly of the rear end of the off/on valve plug. The auxiliary housing member includes a valve operator that is operatively connected to the rear end of the off/on valve plug. The valve operator has first and second positions. It is adapted to permit rearward movement of the off/on valve plug into its open position when the valve operator is in its first position. It is also adapted to impose an axial force on the off/on valve plug, for moving the off/on valve plug into its closed position, when the valve operator is moving from its first position to its second position. The valve operator may be a rotatable cam within a cam cavity in which case the cam is rotatable between first and second positions.

In an embodiment of the invention, a switching valve is incorporated within a valve housing that includes a pressure port, a pressure passageway leading from the pressure port to the switching valve, a return port, and a return passageway leading from the switching valve to the return port. The housing further includes first, second, third and fourth in/out ports. A first in/out passageway leads from the switching valve to the first in/out port. A second in/out passageway leads from the switching valve to the second in/out port. A third in/out passageway leads from the first in/out passageway to the third in/out port. A fourth in/out passageway leads from the second in/out passageway to the fourth in/out port. In this embodiment, the third in/out passageway includes a first valve seat. The fourth in/out passageway includes a second valve seat. The housing includes a first directional valve plug that is movable between a closed position in which it seats on the first valve seat and an open position in which it is retracted away from the first valve seat. The housing further includes a second valve plug that is movable between a closed position in which it seats against the second valve seat and an open position in which it is retracted back away from the second valve seat. When the first directional valve plug is in its closed position, the third in/out passageway is blocked and the first in/out passageway is connected to the first in/out port. When the first directional valve plug is in its open position, the first in/out passageway is connected to the third port via the third passageway. When the second directional valve plug is in its closed position, the fourth is in/out passageway is blocked and the second in/out passageway is connected to the second in/out port. When the second directional valve plug is in its open position, the second in/out passageway is connected to the fourth port via the fourth in/out passageway.

In the above described embodiment of the invention, each directional valve plug may include a plug end that faces its valve seat, and a rear end. The housing may include a separate cam cavity that is rearwardly of the rear end of each directional valve plug. A cam in each cam cavity is rotatable between first and second positions. Each cam is operatively connected to the rear end of its directional valve plug. It is adapted to permit movement of its directional valve plug into an open position when the cam is in its first position. Rotation of each cam from its first position to its second position imposes an axial force on the rear end of its directional valve plug, urging the directional valve plug into its closed position.

Each directional valve plug may include an axial passageway. Pressure may be connected by the actual passageway to a region rearwardly of the rear end of the directional valve plug. When the cam is in its second position, the region rearwardly of the rear end of the directional valve plug is closed and the pressure in it exerts an axial force on the directional valve plug, urging the directional valve plug towards a seated position. Each cam may include a vent passageway that is closed when the cam is in its second position and which connects the region rearwardly of the rear end of the directional valve with return when the cam is in its first position. In some embodiments, the housing may include a piston chamber between the rear end of each directional valve plug and its cam. A piston end in each piston chamber has an outer end that contacts the cam. A compression spring is positioned between the rear end of the directional valve plug and its piston.

In the valve assembly which includes the two directional valve plugs, when the first directional valve plug is in its open position, the second directional valve plug is in its closed position. When the first directional valve plug is in its closed position, the second directional valve plug is in its open position.

According to an aspect of the invention, a single rotatable control member may be provided for controlling the first and second directional valve plugs. This control member has a first position in which the first directional valve plug is open and the second directional valve plug is closed. It has a second position in which the first directional valve plug is closed and the second directional valve plug is open. A handle may be operatively connected to the rotatable control member. The handle may be swingable between a first position in which the control member is in its first position and a second position in which the control member is in its second position.

The valve housing may be formed of several portions that are connected together. For example, the switching valve may be located in a housing central portion that is sandwiched between two housing end portions. In such valve assembly, the pressure port, the return port, the first in/out port and the third in/out port are in the first housing end portion. The other housing end portion includes the second in/out port and the fourth in/out port. The first housing end portion may also include a shunt passageway extending between portions of the pressure and return passageways, and may further include a valve plug movable into the shunt passageway, to close the shunt passageway, and movable out from the shunt passageway, to open the shunt passageway. This arrangement of the valve plug and the shunt passageway to the pressure and return passageways provides an off/on valve.

In some embodiments, the housing may include an auxiliary housing portion attached to the first housing end portion, rearwardly of the rear end of the off/on valve plug. The auxiliary housing portion may include a valve operator that is operatively connected to the rear end of the off/on valve plug. The valve operator has first and second positions. It is adapted to permit rearward movement of the off/on valve plug into its open position when the valve operator is in its first position, and to impose an axial force on the off/on valve plug, for moving it into its closed position, when the valve operator is moving from its first position to its second position.

The arrangement of a shunt passageway between pressure and return passageways, that can be opened and closed by a valve plug, may have other uses than as an off/on valve that is associated with a switching valve. The arrangement of a passageway in a housing leading to an in/out port, with another passageway intersecting it and leading to another in/out port, and a valve plug movable between a first position in which there can be flow from the first passageway into the other passageway, and a second position in which the other passageway is blocked, may have utility in some context other than with in/out passageways that are apart of a switching valve.

These and other advantages, objects, and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 3 is a top plan view of an embodiment of the invention;

FIG. 4 is a first side elevational view of the embodiment of FIG. 3;

FIG. 7 is a first end view of the embodiment of FIGS. 3–6;

FIG. 8 is an opposite end view of the embodiment of FIGS. 3–7;

BEST MODE FOR CARRYING OUT THE INVENTION

Figure 1:
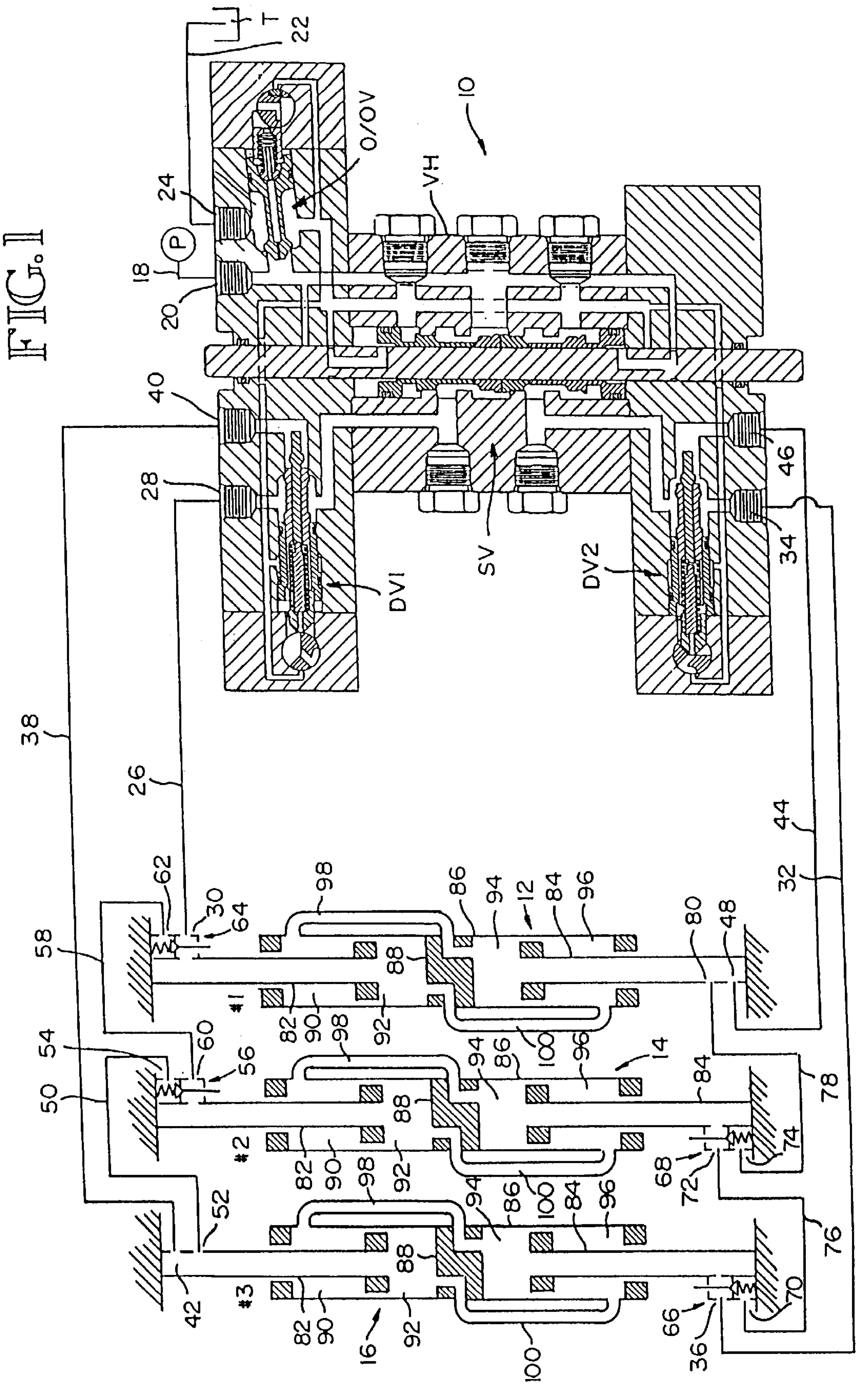
FIG. 1 is a system diagram that exemplifies one use of the valve assembly of the present invention.

For purposes of example, reference will now be made to the illustrated embodiment. FIG. 1 is a system diagram similar to the system diagrams in my aforementioned U.S. Pat. Nos. 4,712,467 (FIG. 11), 4,821,868 (FIG. 7) and 5,622,095 (FIG. 7).

Referring to FIG. 1, the system includes a switching circuit 10 which reverses the direction of fluid pressure and flow to and from the opposite ends of three linear hydraulic motors or drive units 12, 14, 16. Hydraulic pressure and flow are provided by a pump P. A pressure line 18 extends from the pump P to a pressure port 20 in valve housing VH. The system includes a tank T for the hydraulic fluid. A return line 22 extends from a return port 24 in housing VH to the tank T. A first conduit 26 extends from a first in/out port 20 in housing VH to an in/out port 30 at a first end of drive unit 12. A second branch conduit 32 extends from a second in/out port 34 in housing HV to an in/out port 36 at the second end of drive unit 16. A third branch conduit 38 extends from a third in/out port 40 in housing HV to an in/out port 42 at the first end of drive unit 16. A fourth branch conduit 44 extends from a fourth in/out port 46 in housing HV to a port 48 at the second end of drive unit 12.

As explained in my aforementioned U.S. Pat. No. 4,821,868, in a reciprocating slat conveyor, each drive unit 12, 14, 16 drives one third of the conveyor slats. Each drive unit 12, 14, 16 is connected to a separate transverse drive beam. Each transverse drive beam includes a plurality of connector elements, one for each conveyor slat that is connected to it. In FIG. 1 of U.S. Pat. No. 4,821,868, the transverse drive beams are designated 48, 50, 52 and the connectors are designated 54, 56, 58.

Referring again to FIG. 1, a conduit 50 extends between a second in/out port 52 at the first end of drive unit 16 and a first port 54 in a check valve housing 56 that is located at the first end of drive unit 14. A similar conduit 58 extends from a second port 60 in check valve 56 to a port 62 in check valve housing 64 at the first end of drive unit 12. As discloses in U.S. Pat. No. 4,821,868 (FIGS. 13 and 14), the check valve housings 56, 64 are divided into two chambers by a wall that includes a valve orifice. The first chamber includes the port 62. The second chamber includes port 30. The first chamber of valve 56 includes port 54. The second chamber includes port 60. At the opposite end of the drive unit assembly, a check valve 66 is positioned at the second end of drive unit 16. A check valve 68 is provided at the second end of drive unit 14. Valve 66 has two chambers separated by a wall that includes a valve orifice. One chamber includes port 36. The other chamber includes port 70. Valve 68 also includes two chambers divided by a wall that includes a valve orifice. One chamber includes port 72. The other chamber includes port 74. A conduit 76 extends between ports 70 and 72. A conduit 78 extends between port 74 and a port 80 at the second end of drive unit 12. Check valves 66, 68 are also like the check valves that are disclosed in detail in U.S. Pat. No. 4,821,868. All four check valves 56, 64, 66, 68 includes a valve plug and a valve operator, preferably constructed as shown in U.S. Pat. No. 4,821,868.

Drive units 12, 14, 16 are identical in construction. Accordingly, only one of these drive units will be described, it being understood that the description applies equally as well as to the other drive units. Drive unit 12 includes first and second piston rods 82, 84. Piston rod 82 has inner and outer ends. Its outer end is mounted and a piston head is provided at its inner end. Piston rod 84 also has inner and outer ends. Its outer end is mounted and a piston head is provided at its inner end. By way of nonlimitive example, the outer ends of the piston rods 82, 84 may be attached to frame members in the manner disclosed by U.S. Pat. No. 4,821,868. The mounting of the piston rods 82, 84 fixes the pistons rods 82, 84 in position relative to each other, with a linear space existing between the piston heads. A cylinder barrel 86 is mounted on the piston rods 82, 84 and the piston heads, for back and forth travel there along. The cylinder barrel 86 is preferably constructed in two sections, with the inner ends of each section being connected to a transverse center wall 88. A first fluid chamber 90 is formed within cylinder barrel 86 between a cylinder head at the near end of cylinder barrel 86 and the piston head on piston rod 82. A second fluid chamber 92 is formed between the same piston head and the divider wall 82. A third fluid chamber 94 is formed between the divider wall 88 and the piston head on piston rod 84. A fourth fluid chamber 96 is formed between the same piston head and the cylinder head at the near end of cylinder housing 86. Chamber 90 is connected to chamber 94 and chamber 92 is connected to chamber 96. This may be done by the use of a pair of rigid lengths of tubing 98, 100, as illustrated.

The sequencing valves 56, 64, 66, 68 are like the sequencing valves that are disclosed in my aforementioned U.S. Pat. No. 4,821,868. Therefore, they will not be redescribed here. Rather, reference is made to drawing FIGS. 13 and 14, and the description relating to such drawing figures, that are set forth in U.S. Pat. No. 4,821,868. All of the disclosure of that patent relating to the check valves, and the manner of their operation in the system, is hereby incorporated herein by this specific reference.

Figure 2:
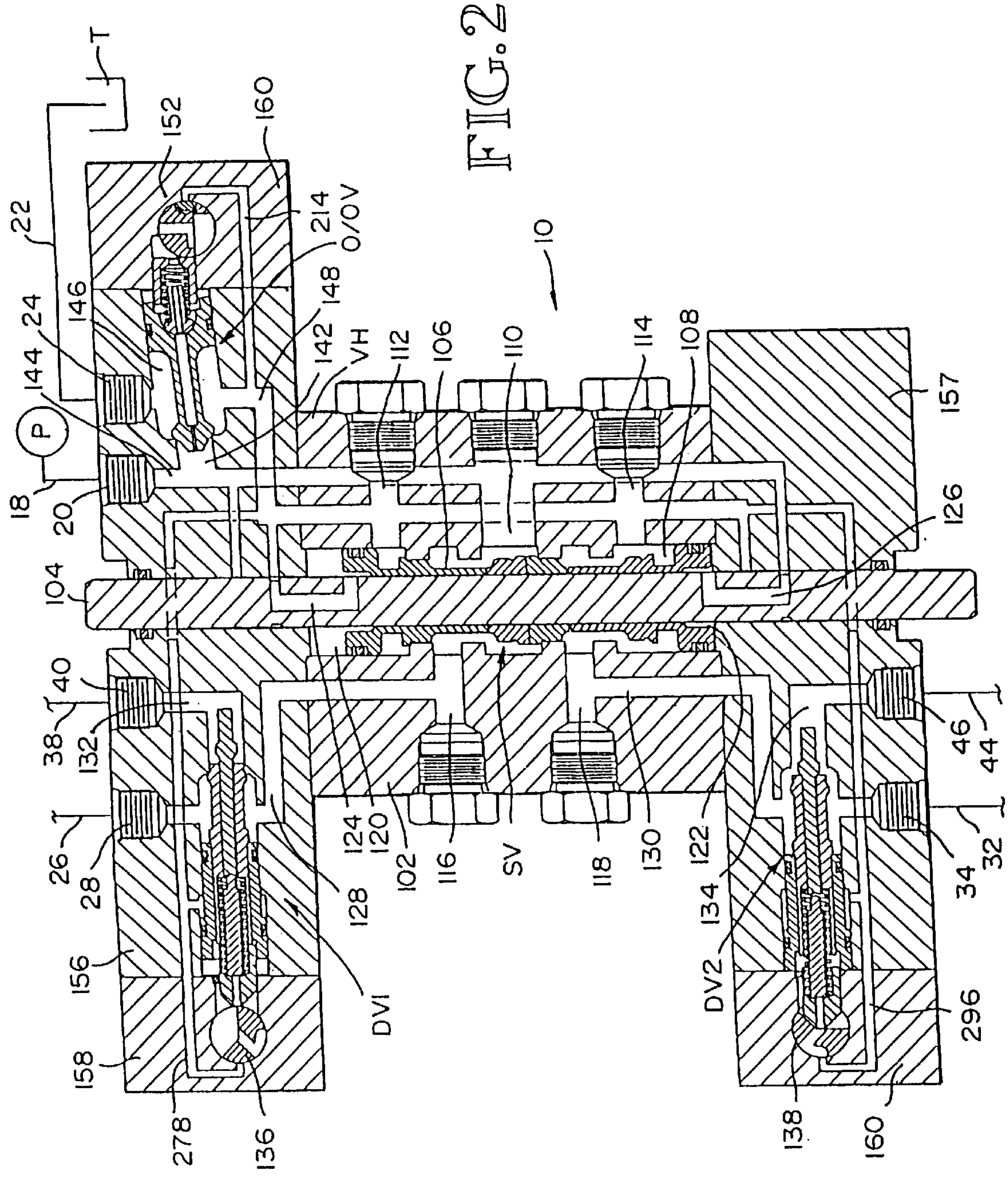
FIG. 2 is an enlarged scale fragmentary view of the valve assembly portion of FIG. 1.
Figure 5:
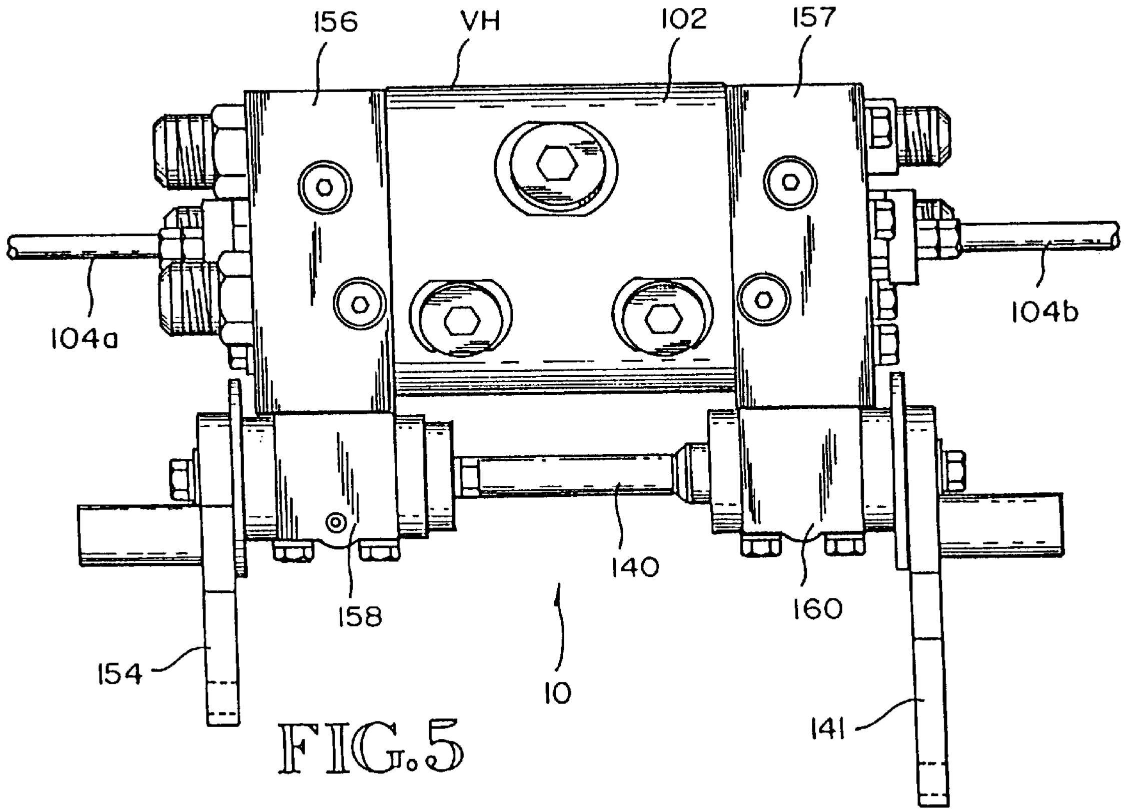
FIG. 5 is a bottom plan view of the embodiment of FIGS. 3 and 4.
Figure 6:
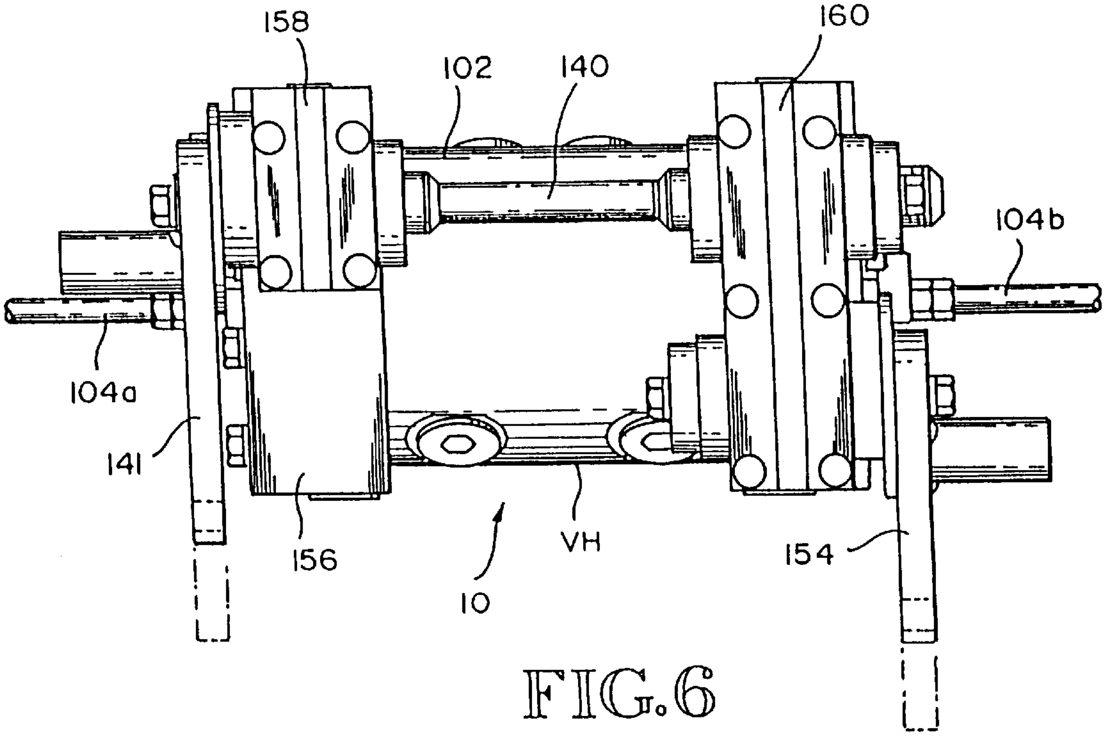
FIG. 6 is an opposite side elevational view of the embodiment of FIGS. 3–5.

Reference is now made to FIG. 2. In FIG. 2, a switching valve section SV is shown within a central portion 102 of the housing 10. Key elements of the switching valve SV are a control rod 104, a pair of poppets 106, 108, a pressure cavity 110, a pair of return cavities 112, 114 and a pair of in/out cavities 116, 118. Also key are pilot chambers 120, 122, and passageways 124, 126 in the control rod 104. The control rod 104 has two end positions. In one position, passageway 124 communicates pilot chamber 120 with pressure and passageway 126 communicates pilot chamber 122 with return. In the second position of control rod 104, passageway 124 communicates pilot chamber 120 with return and passageway 126 communicates pressure with pilot chamber 122.

Switching valve section SV operates essentially as described in the aforementioned U.S. Pat. No. 5,103,866. When the two poppets 106, 108 are in the position shown by FIG. 2, pressure is connected to in/out cavity 116. In/out cavity 118 is connected to return cavity 114. When control rod 104 is moved to its second position, the poppets 106, 108 are caused to move upwardly as pictured in FIG. 2. In/out cavity 118 becomes connected to the pressure cavity 110. In/out cavity 116 becomes connected to return cavity 112. The contents of U.S. Pat. No. 5,103,866 are incorporated herein by this specific reference.

Figure 11:
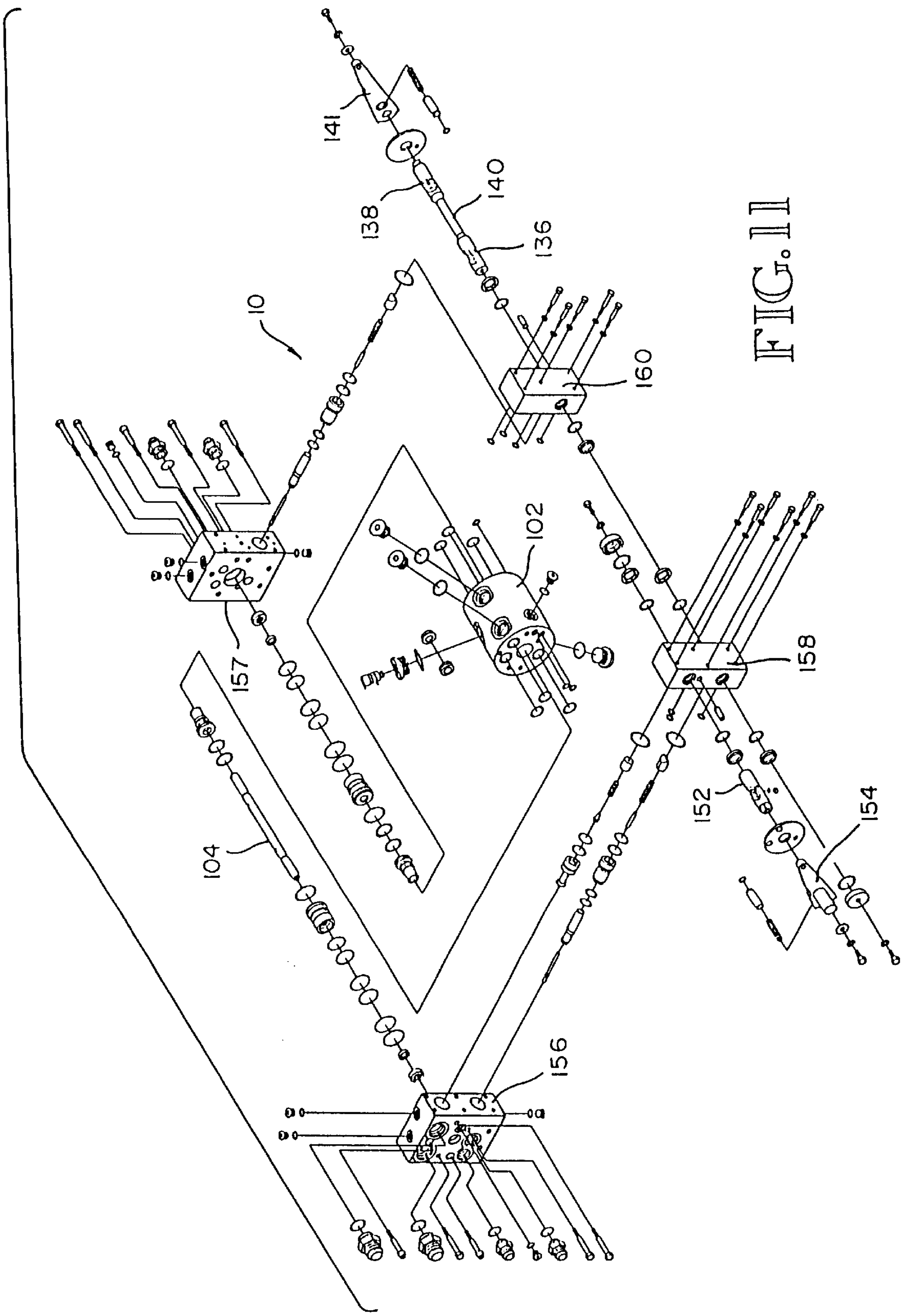
FIG. 11 is an exploded pictorial view of the embodiment of FIGS. 3–8.

In/out cavity 116 is connected to in/out port 26 by a first in/out passageway 128. In/out cavity 118 is connected to in/out port 32 by a second in/out passageway 130. A third in/out passageway 132 connects in/out passageway 128 to in/out port 40. A fourth in/out passageway 134 connects in/out passageway 130 with in/out port 46. Valve assembly 10 is provided with a pair of directional valves DV1, DV2 that operate together to control fluid pressure and flow to and from ports 40, 46. In FIG. 2, valve DV1 is shown in a closed position. This means that the port leading from passageway 128 into passageway 132 is closed. Passageway 128 is connected to port 26 but not to port 40. As can be seen from FIG. 2, passageway 128 is always in communication with port 28. In FIG. 2, valve DV2 is open. That means that the port leading from passageway 132 to passageway 134 is open. When valve DV2 is in its open position, passageway 130 is in communication with both port 34 and port 46. In one embodiment, the valves DV1 and DV2 are controlled by rotary cams that are separate sections on a common cam shaft 140 (FIG. 11). As will hereinafter be described, cam shaft 140 is rotated between first and second positions. In the first position, cam 136 exerts and endwise force on the valve plug for valve DV1, moving it into a seated position closing valve DV1. At the same time, cam 138 is positioned to allow a retraction of the valve plug for valve DV2 into a position opening communication between passageways 130 and 134. When the cam rod 140 is moved into its second position, valve DV2 is closed and valve DV1 is open. The construction and operation of the directional valves DV1, DV2 are hereinafter described in some detail.

According to an aspect of the invention, the system is provided with an on/off valve O/OV. It includes a two position valve poppet positioned to open or shut a shunt passageway 142 that extends from pressure passageway 144 to a return cavity 146 in return passageway 148. When the shunt passageway is closed, pressure passageway 144 is connected to pressure cavity 110 and return passageway 148 is connected to return port 24. A pump P or the like brings pressure to pressure port 20. A return line 150 extends from return port 24 to a tank T or reservoir for the system fluid. When valve O/OV is open, pressure is shunted from pressure passageway 144 to the return cavity 146 and return port 24 via the shunt passageway 142. The system is off when the shunt passageway is open because there is not a delivery of pressure through the switching valve SV to make the system operate. The valve plug VP1 for the on/off valve O/OV may be controlled by a cam 152 that is at the rear end of the valve plug. Cam 152 has two positions. When it is in its first position, it exerts an endwise force on the valve plug VP1 moving it into a seated or valve closing position. When cam 152 is in its second position, it allows retraction of the valve plug VP1 to open the shunt passageway 142 and cause communication between pressure passageway 144 and return port 24. As will be described, cam 152 may be a section of a rotating shaft that includes a handle 154 that may be very similar to the control handle 141 for the cam shaft 140 (FIG. 11).

In one embodiment, the valve housing VH is formed in sections that are then connected together. Because of the integration of the separate housing sections, the valve housing VH is considered to be a single or unitary housing. Valve housing VH may comprise a central portion 102, two end portions 156, 158 and two auxiliary portions 158, 160. One of the directional valves (e.g. valve DV1) and the on/off valve O/OV may be incorporated within end portion 156, the second directional valve (e.g. valve DV2) may be incorporated in end portion 158. Control elements for the valves DV1, O/OV, DV2 may be incorporated into the auxiliary housings 158, 160.

FIGS. 3–8 show an example orientation of the valve assembly 10. These views show an example location of the cam shaft 140, the handles 141, 154, the portions of the valve housing VH and the various ports. Key features and advantages of the valve assembly 10 include a convenient placement of the control handles 141, 154 for the directional and off/on valves DV1, DV2, O/OV. Also, the integration of the several valves into a single valve housing VH greatly simplifies the arrangement of fluid conduits leading to and from the valve housing VH. There are six ports and six primary conduits 18, 20, 26, 32, 38, 44. These conduits are shown in FIG. 1.

Figure 9:
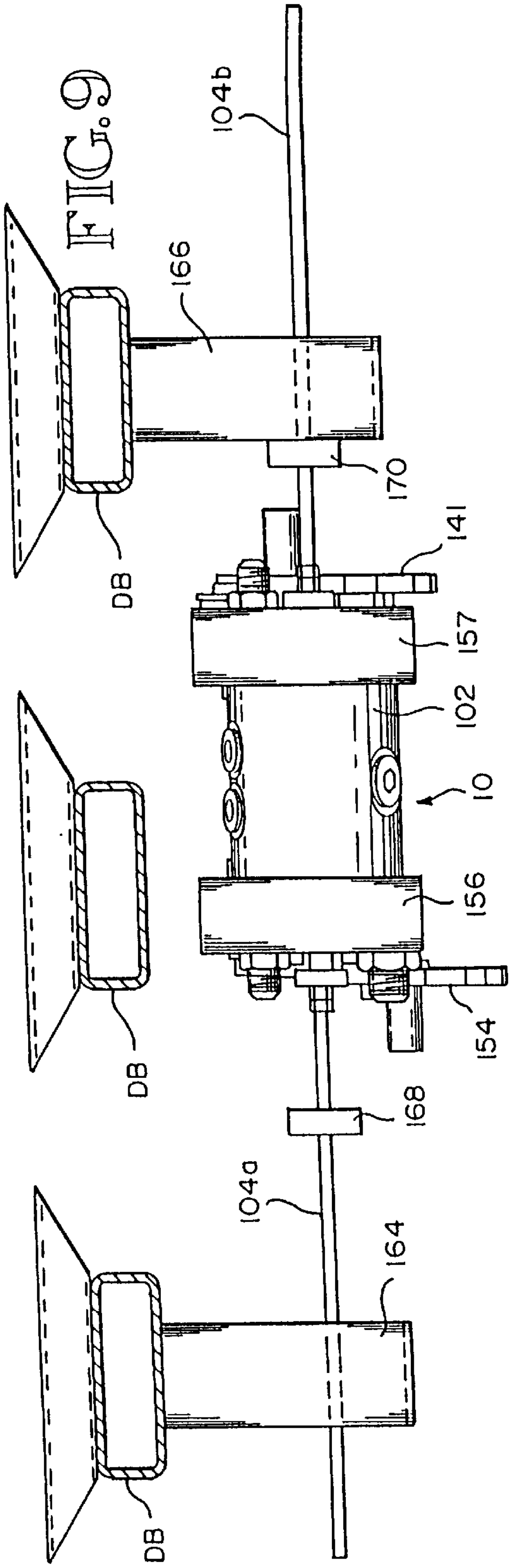
FIG. 9 is a side view of a portion of a reciprocating slat conveyor, including an end view of three transverse drive beams, and showing a control rod portion of the valve assembly in a first position.
Figure 10:
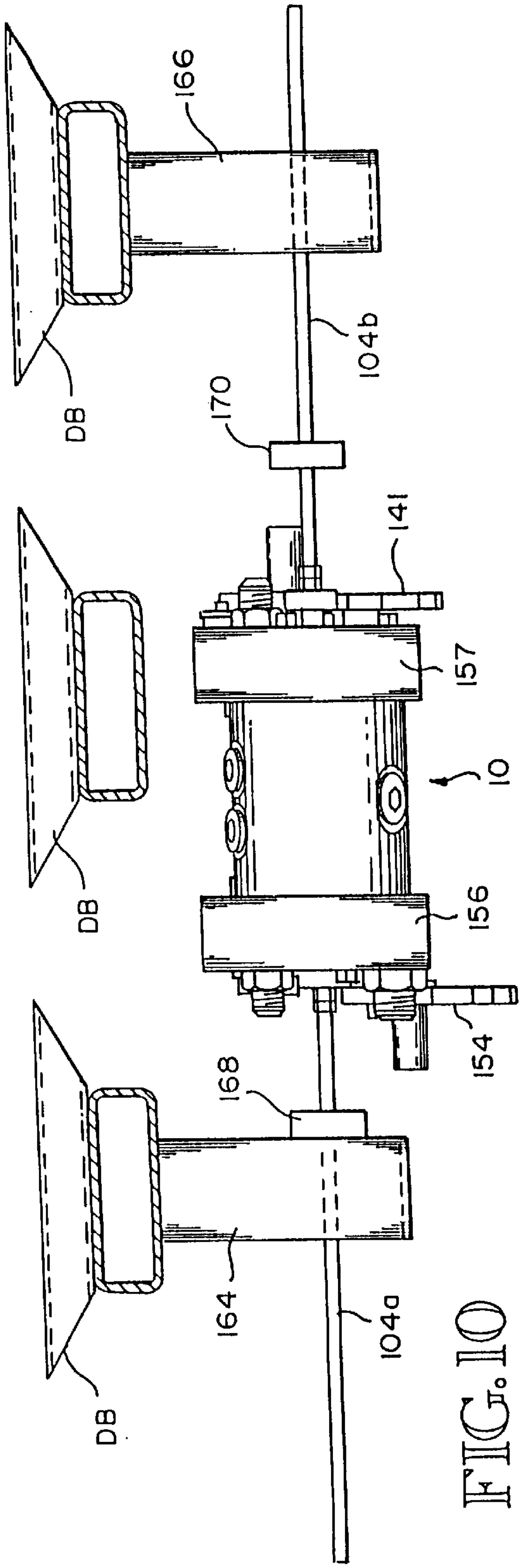
FIG. 10 is a view like FIG. 9 but showing the control rod portion of the valve assembly in a second position.

FIGS. 9 and 10 are like FIGS. 7 and 9 in U.S. Pat. No. 5,103,866. They show the relationship of the valve assembly 10 with the transverse drive beams DB that are connected to the drive units 12, 14, 16 and to which the conveyor slats are connected, in a reciprocating slat conveyor. The valve assembly 10 was developed for use with a reciprocating slat conveyor. However, it is believed that it has other uses as well.

Referring to FIGS. 9 and 10, the drive beam DB shown on the left includes a control arm 164. The drive beam DB shown on the right shows a similar control arm 166. The control arms 164, 166 are positioned to contact bumpers 168, 170 that are on extensions 104A, 104B to the control rod 104. Movement of arm 164 against bumper 168 while arm 166 is being moved away from bumper 170, moves the control rod 104 to the right as pictured in FIGS. 9 and 10. Movement of arm 166 against bumper 170 while arm 164 is moved away from bumper 168 shifts the control rod 104 to the left in FIGS. 9 and 10.

FIG. 11 is an exploded pictorial view of the valve assembly 10. In this view, only the major elements are identified by reference numerals. The other elements can be identified as to what they are by the fact that they are pictured. The operating pars of the various valves have either been described above or will later be described.

Figure 12:
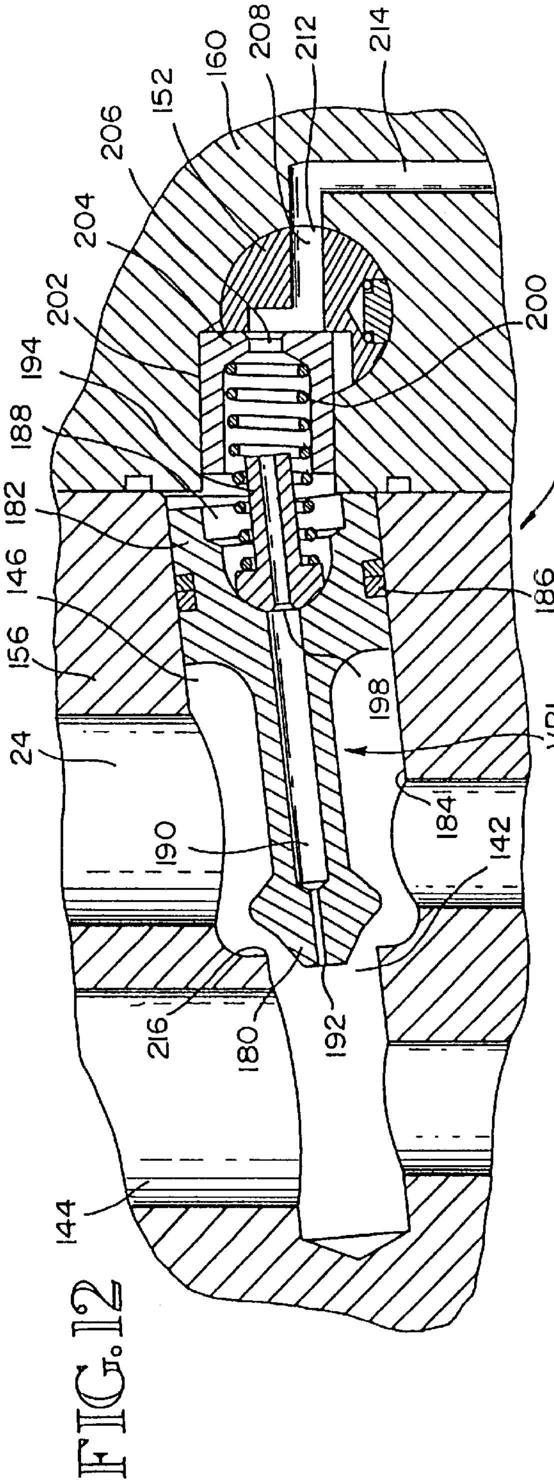
FIG. 12 is a longitudinal sectional view of the off/on valve, shown in an "off" condition.
Figure 13:
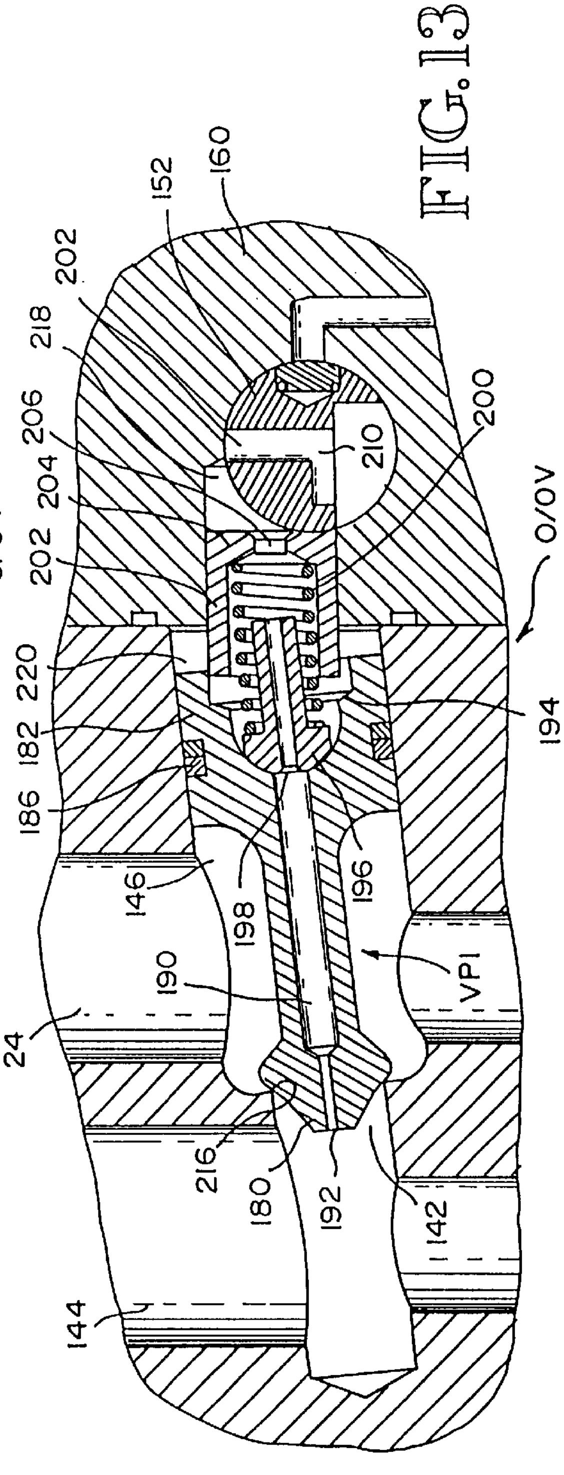
FIG. 13 is a view like FIG. 12, but showing the valve in an "on" condition.

Referring to FIGS. 12 and 13, the valve plug VP1 includes an plug end 180 that is at one end of an elongated body. A piston 182 is located at the opposite end of the elongated body. Piston 182 fits into a bore 184 formed in housing part 156. A suitable seal 186 seals between piston 182 and bore 184. The rear portion of piston 182 includes a cavity 188. An axial passageway extends through the valve body from valve passageway 144 to the cavity 188. The portion of this passageway that is located in the plug part 180 is designated 192. This portion of the axial passageway is smaller in diameter than the main portion 190.

A member 194 is positioned behind the valve plug VP1. It includes an enlarged end portion 196 that is located within a forward portion of the cavity 188. The forward portion of the cavity and the contacting end portions 196 of member 194 have mating spherical surfaces. The portion of member 194 that is rearwardly of end portion 196 is smaller in diameter than end portion 196. This forms a radial shoulder against which the forward end of a compression spring 200 bears. The rearward end of the spring 200 is positioned within a cup shaped piston 202. Piston 202 has a rear wall 204 that includes a central opening 206. Opening 206 communicates the interior of the piston 202 with a passageway 208 that is formed in cam 152. Cam 152 includes a notch that is sized to receive the outer end portion of piston 202. FIG. 12 shows the outer end portion of piston 202 positioned within the notch. In this position, the end surface 204 is against a notch base surface that includes a first end portion of the passageway 208. This end portion is designated 210 in FIG. 13. When piston end surface 206 is against the notch base surface, as shown in FIG. 12, opening 206 is in communication with end portion 210 of passageway 208. The opposite end portion 212 of passageway 208 is in communication with a return passageway 214 that extends through housing part 160 and then into housing part 156. FIG. 2 shows that the return passageway 214 leads to the return passageway 148 in housing part 156.

When cam 152 is in the position shown by FIG. 12, pressure from passageway 144 will be directed via passageways 192, 190 and 198 into the interior of piston 206. This pressure is then communicated by opening 206 in passageway 208 with the return passageway 214. At the same time, the region outwardly of piston 182 is vented to passageway 214. Spring 200 tends to exert an endwise force on first member 194 and then on valve plug VP1, tending to move the plug end 180 against valve seat 216. However, the pressure in region 142 is sufficient to exert an endwise force against plug end 180 that will overcome the force of the spring 200 and move the valve plug VP1 into the position shown by FIG. 12. This provides a passageway between plug end 180 and valve seat 216 through which pressure from passageway 144 is shunted into return passageway 24. As previously stated, when the valve plug VP1 is in this position, the system is off because the shunting of the pressure results in insufficient pressure entering the system to operate the system.

When cam 152 is rotated ninety degrees into the position shown by FIG. 13, a portion of cam 152 having a circular outside configuration is moved against wall 204 of piston 202. As the cam 152 rotates from the position shown in FIG. 12 into the position shown in FIG. 13, the circular surface exerts an endwise force on wall 204, forcing (i.e. caming) piston 202 against the spring 200 and towards the valve plug VP1. The spring 200 exerts a force on member 194 that moves its end portion 196 against the contacting surface within piston 182. At this time, pressure from passageway 144 enters into restricted passageway 192 and moves into passageway 190 in valve plug VP1 and then into passageway 198 in piston 194. This pressure moves from passageway 198 into the interior of piston 202 and then into the chamber 220 that is formed by and between the outer end of piston 182 and a confronting surface of housing part 160. The pressure builds up in this chamber 120 and aids the spring 200 in forcing the valve plug VP1 into the position shown by FIG. 13. In this position, the plug end 180 is in contact with the valve seat 216. The spring force and the pressure in chamber 220 are sufficient to resist the force created by the pressure 144 that acts on the plug end 180. That is, the spring force and the pressure in chamber 220 are sufficient to seat the valve plug VP1 and hold it in a seated position so long as the cam 152 is in the shown by FIG. 13.

FIGS. 14–17 show operation of the directional valves DV1 and DV2. Valve DV1 is herein also termed the "rear" valve. Valve DV2 is herein also termed the "front" valve.

Directional valve DV1 includes an elongated valve plug assembly 220. It is composed of a tubular piston 222 having a small diameter portion that is located within bore 224 and a large diameter portion that is located within bore 226. Seal ring assemblies 228, 230 seal between the piston member 222 and the bores 224, 226. A chamber 232 is formed between an outer end of the piston member 222 and an adjoining wall of housing part 158. Region 224 is connected to a vent passageway 236. Opposite chamber 232, piston member 222 has an end surface 238 that is in communication with port 28 and passageway 128. A valve plug member VP2 has a first portion that is housed within the piston member 224 and a second portion 242. Portion 240 has a socket at its inner end that opens towards a piston member 244. Piston member 244 has an inner end that fits into an outer end portion of piston member 22 and an outer end 246 that contacts cam 136.

Figure 15:
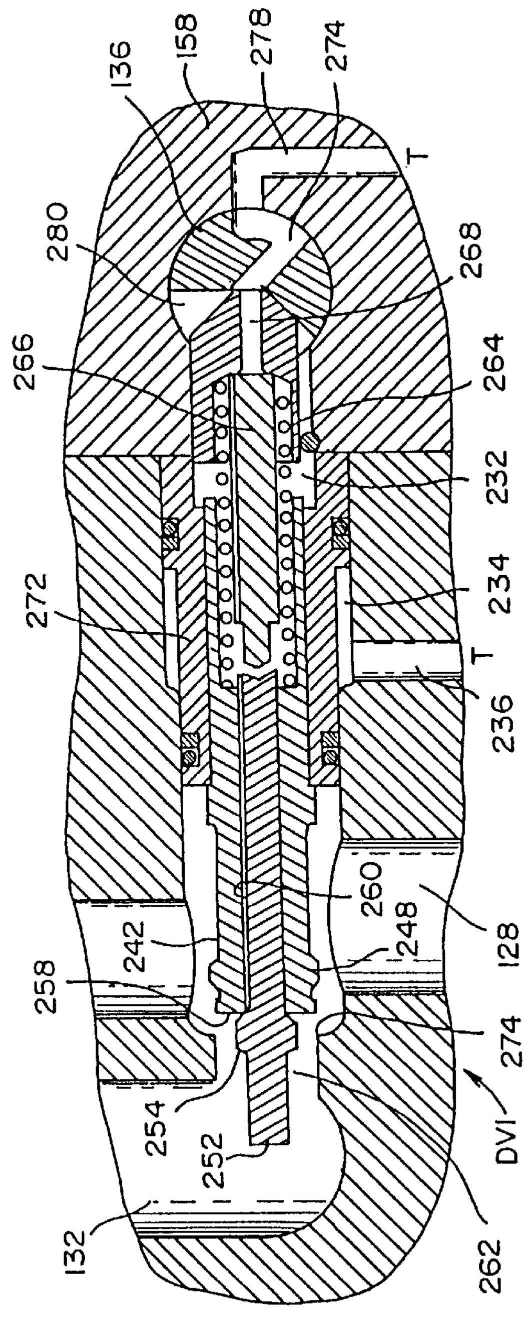
FIG. 15 is a view like FIG. 14, but showing the "rear" valve in an open position.

The end of valve plug member VP2 opposite the piston 244 includes a plug end 248. An axial passageway 250 extends through the inner end portion of valve plug member VP2. A body portion of a control plug 252 is positioned within passageway 250. Outwardly of plug in 248, the control plug 252 includes a plug head 254. Plug head 254 has a closure surface 256 that confronts an end surface 258 on valve plug portion 242 (FIG. 15). Control plug 252 is formed to include a longitudinal passageway 260. A projecting end portion of control plug 252, that includes plug head 254, is located within passageway 132.

Valve plug portion 242 extends across passageway 128 and its plug end 248 is positioned, to move into and out from a connecting passageway 262. As best shown by FIG. 15, the connecting passageway 262 connects passageway 132 with passageway 128. That is, it makes this connection when the passageway 262 is open.

At the opposite end of the valve plug member VP2, an inner end portion of a spring 264 is located within a socket formed in valve plug member 240. The outer end portion of this spring 264 is located within a cavity formed in the inner end portion of piston 244. A control plug 266 is positioned within the spring 264. The inner end of control plug 266 contacts a confronting inner end of control plug 252. The outer end of control plug 266 may contact a base wall in piston 244. This base wall includes a passageway 268. Control plug 266 is constructed to include a longitudinal passageway 270. Passageway 270 is like passageway 260 (FIG. 15).

Figure 14:
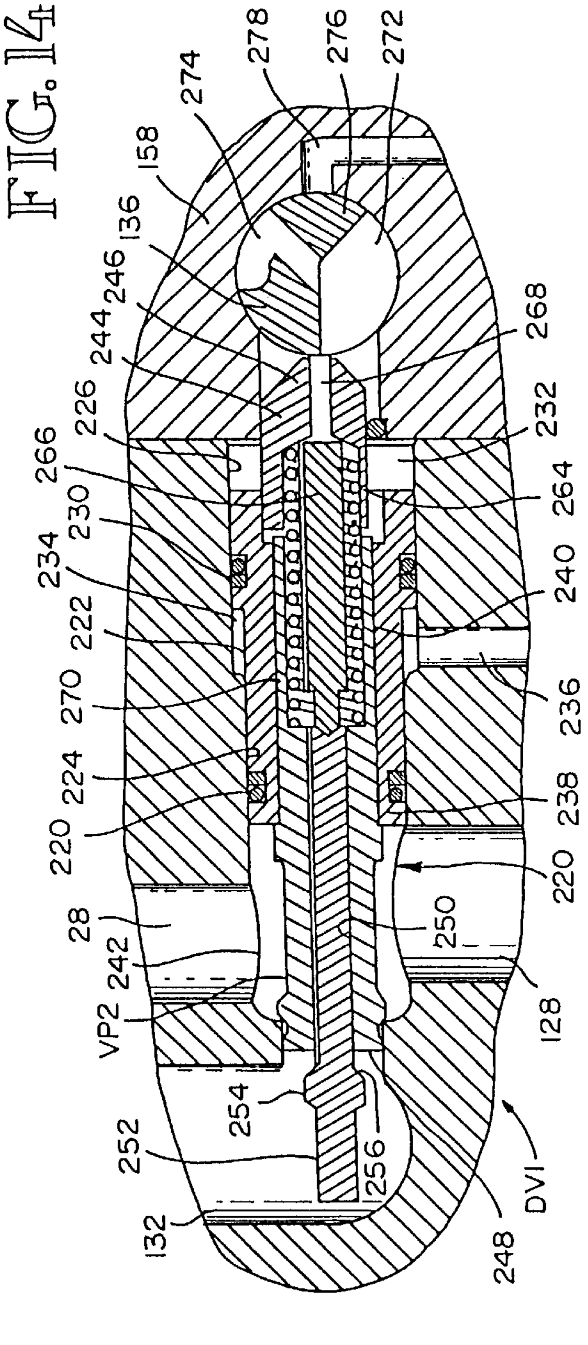
FIG. 14 is a longitudinal sectional view of what is referred to as the "rear" valve, shown in a closed position.

When the cam 136 is in the position shown by FIG. 14, it exerts an endwise force on piston 244, moving piston 244 to the left, as illustrated. As piston 246 moves, it exerts a force on the spring 264. Spring 264 exerts a force on valve plug member 242, urging its closure plug 246 against the valve seat 274 (FIG. 15). At the same time, control plug 266 exerts an endwise force on control plug 252, moving it to the left, as illustrated. This movement moves closure plug 256 away from the end surface 258. It also opens communication of passageway 260 with passageway 132. This allows any pressure in passageway 132 to enter passageway 260. This fluid pressure is directed by passageway 260 to passageway 270. This pressure enters the interior of piston 246 and then moves through a side opening in piston 246 into chamber 232. Once inside chamber 232, it exerts an endwise force against the piston 222, moving it into the position shown by FIG. 14. When in this position, the piston 222 exerts an endwise force on valve plug member 242, moving it and its closure plug 248 against valve seat 274 (FIG. 15). Fluid pressure from passageway 268 may move into the regions 272, 274 in cam 136. However, this fluid will be trapped in these regions 272, 274 because a land portion 276 closes access to passageway 278. When the valve plug assembly is in the position shown by FIG. 14, the passageway 262 is closed.

Cam 136 may be rotated into the position shown by FIG. 15. When in this position, a cavity 280 is presented to the outer end portion 246 of piston 244. The cavity 280 is sized to accommodate the outer end portion 246 of piston 244. As a result, the outer end portion 246 of piston 244 enters into the cavity 280. At the same time, the passageway 266 is in communication with open space 274 in cam 136. Open space 274 is also in communication with the vent passageway 278. As a result, pressure fluid within the valve plug assembly, and within chamber 232, is drained via passageway 268 and space 274 into return passageway 278. At the same time, pressure in passageways 132, 264 act on the outer end portions of control plug 252 and control plug 242, moving them to the right, as illustrated. Control plug 252 moves until its closure plug 256 contacts a valve seat formed in the end 258 of closure plug 242. This stops further movement of pressure from passageways 132, 262 into passageways 260, 270. When the valve plug assembly is in the position shown by FIG. 15, the passageway 262 is open and there is a communication between passageway 132 and passageway 128.

Figure 16:
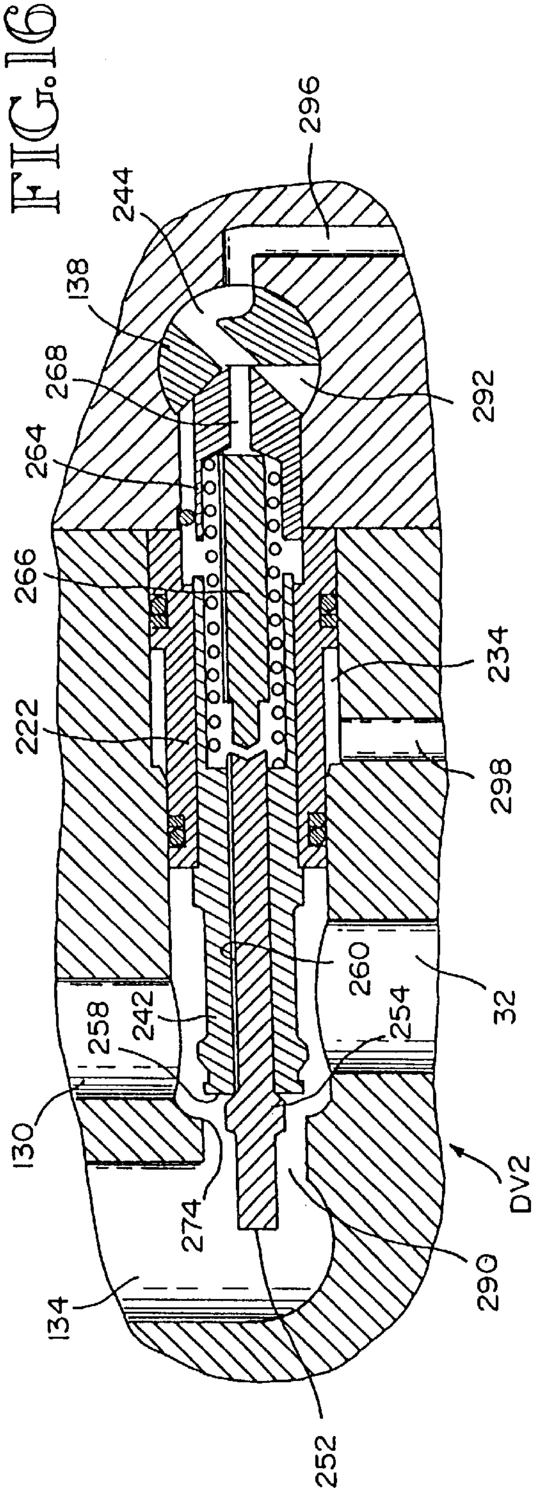
FIG. 16 is a view like FIGS. 14 and 15, but of what is referred to as the "front" valve, shown in an open position.
Figure 17:
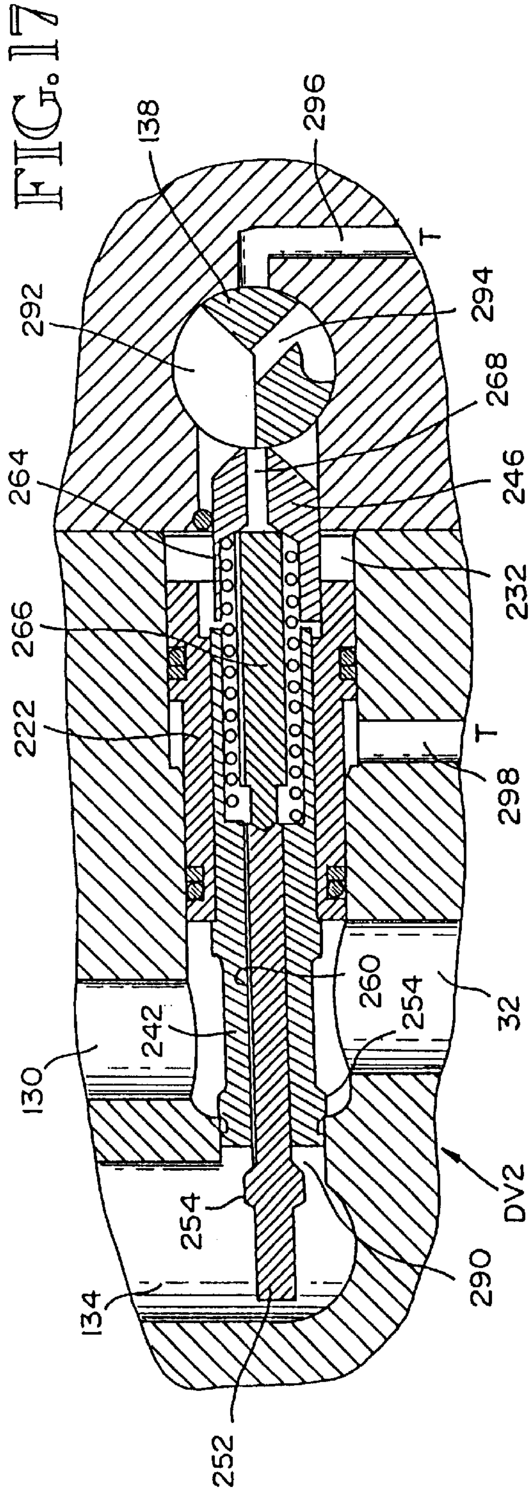
FIG. 17 is a view like FIGS. 14–16, but showing the "front" valve in a closed position.
Figure 18:
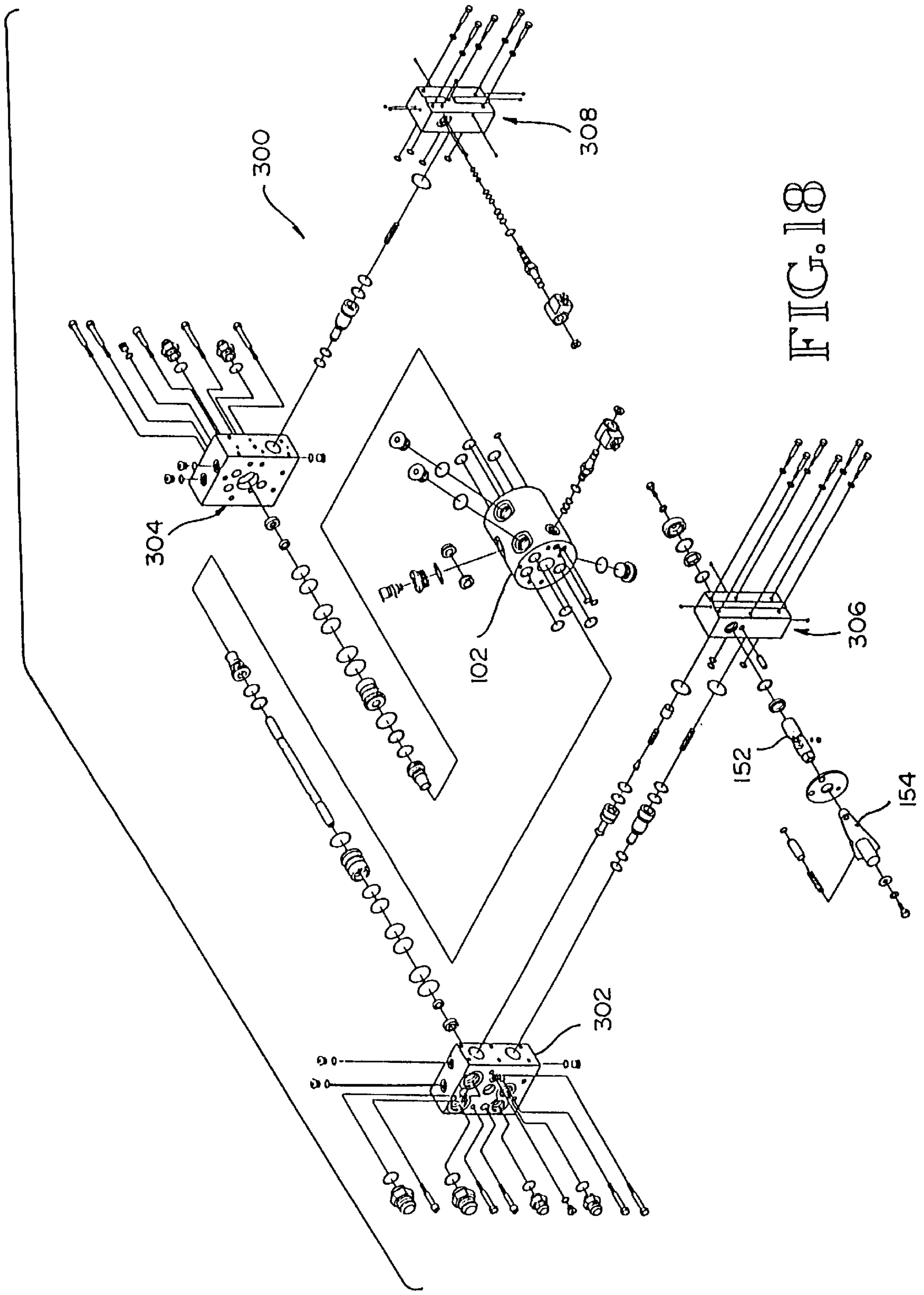
FIG. 18 is a view like FIG. 11, but of a modified form of the invention, in which solenoid valves are used to control the on/off and directional valves, in place of the cams in the earlier embodiment.

FIG. 16 and 17 show the two positions of valve DV2. When valve DV1 is in the position shown by FIG. 14, valve DV2 is in the position shown by FIG. 16. When valve DV1 is in the position shown by FIG. 15, valve DV2 is in the position shown by FIG. 17. Because the valve structure is the same for valves DV1 and DV2, there is no need to repeat the above description except to point out that the passageways are different and the cams are different. In FIGS. 15 and 16, a passageway 290 is provided between passageways 134 and 130. Cam 138 includes an open space 292 and a passageway 294. They communicate with a return passageway 296. A return passageway 298 connects with the return passageway 296.

FIG. 1 shows the off/on valve O/OV in its "off" position and a system "on" postion. This is the position that is shown by and described with respect to FIG. 13. When it is desired to turn the system off, the operator need only grasp and swing the handle 154 from the end position that it is in over into its other end position. Movement of handle 141 cause a rotation of the cam 152 from the position shown in FIG. 13 to the position shown in FIG. 12. When cam 152 is in the position shown in FIG. 12, the poppet end 180 is moved by pressure within passageway 144 into the position shown by FIG. 12. In this position, the shunt passageway 142 is open and pressure in passageway 144 is shunted to port 24 and line 22 that leads to tank T. Valve O/OV is "open" or "on" but the system is "off."

When it is desired to change the conveying direction of the conveyor, the operator need only grasp handle 154 and move it from the end position that it is in over into its other end position. This causes a rotation of cam rod 140 and its two cams 136, 138. When valve DV1 is in the position shown by FIGS. 1 and 14 and valve DV2 is in the position shown by FIGS. 1 and 16, a swinging of the handle 141 into its second end position will move valve DV1 into the position shown by FIG. 15 and valve DV2 into the position shown by FIG. 17.

FIGS. 18–22 show a modified system 300. This system 300 comprises a housing part 302 that is basically like housing part 156. It includes housing part 304 that is basically like housing part 157. It includes housing part 306 which replaces housing part 158. It includes housing part 308 which replaces housing part 162. Handle 154, cam 152 and off/on valve O/OV are retained. However, handle 141, cams 136, 138 and the valves DV1 and DV2 are replaced by fluid operated valves DV3 and DV4. Solenoid operated valve SV1 and SV2 are added. The construction and operation of switching valve 102 otherwise remains the same.

Figure 19:
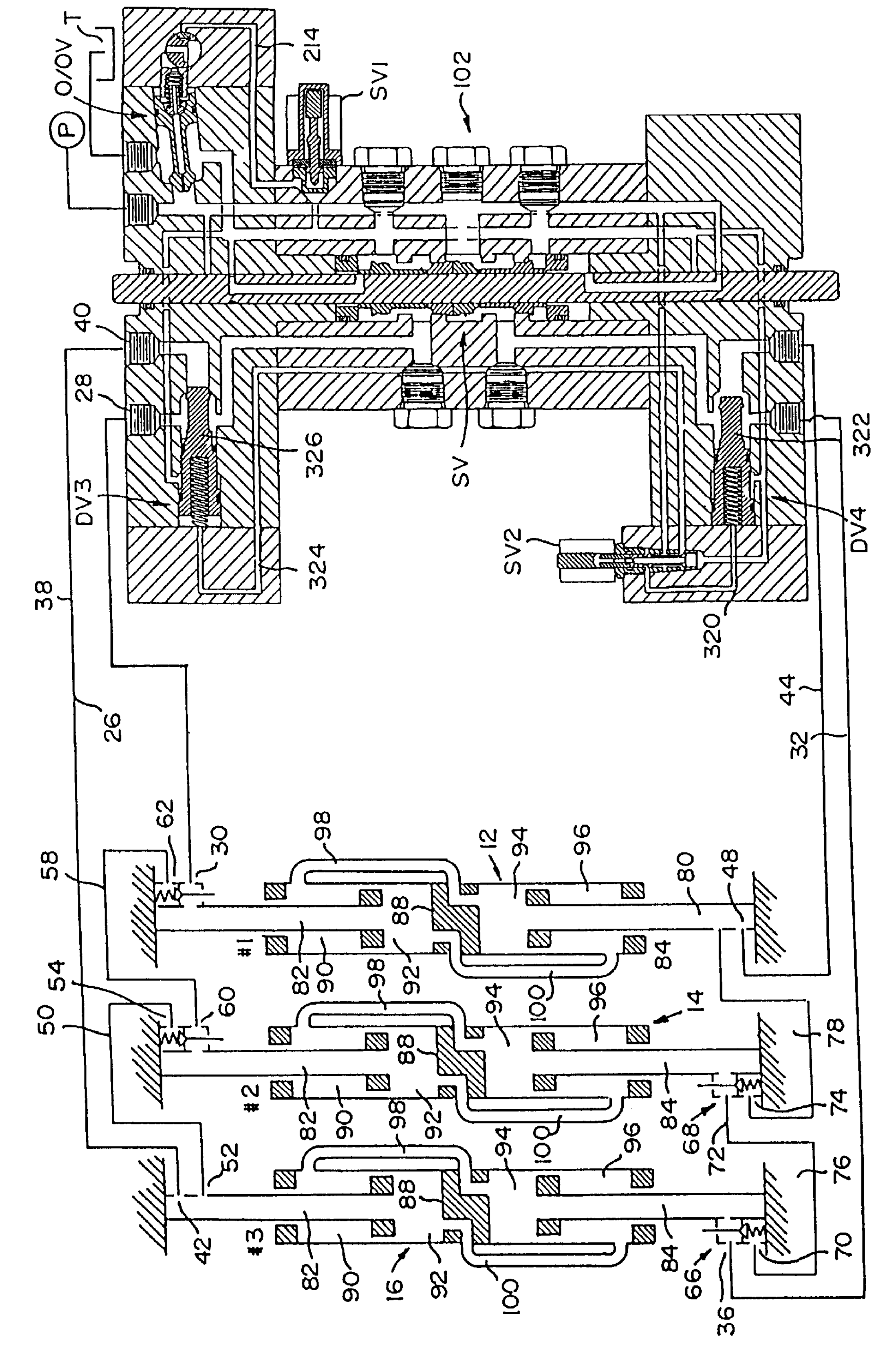
FIG. 19 is a view like FIG. 1, but of the solenoid operated embodiment.
Figure 20:
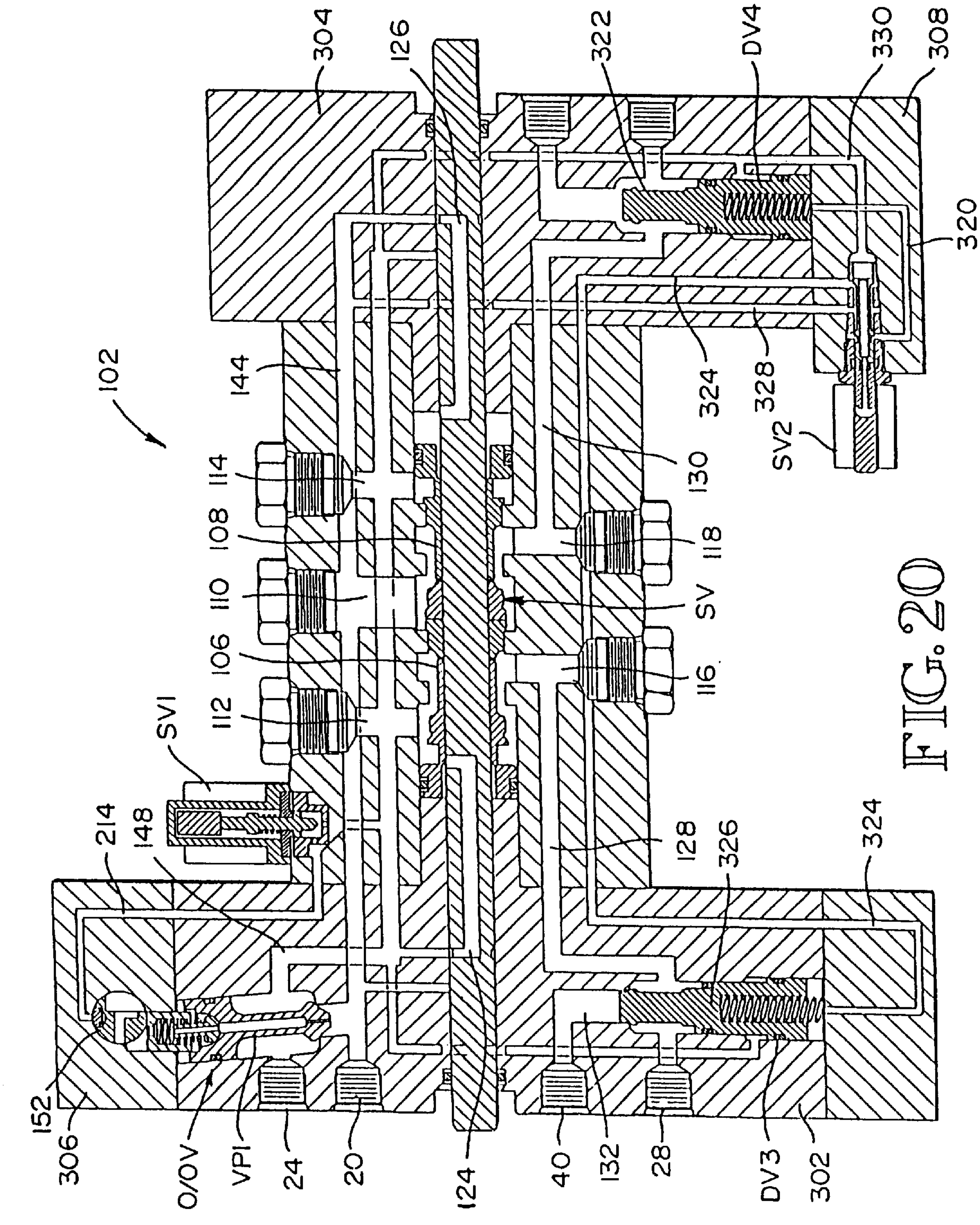
FIG. 20 is a view like FIG. 2, but of the solenoid operated embodiment.
Figure 22:
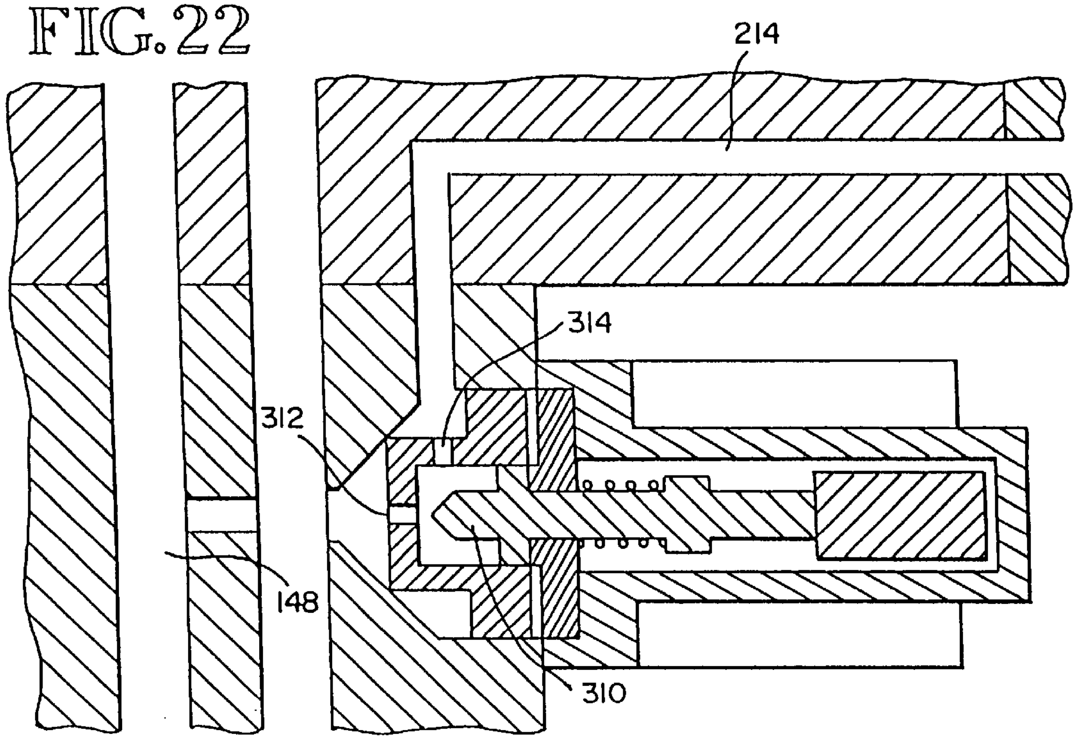
FIG. 22 is an enlarged scale, fragmentary sectional view of the solenoid valve that controls the valve plug of the on/off valve.

Referring to FIGS. 19 and 20, the solenoid valve SV1 is shown positioned in return line 214 leading from the base of valve poppet BP1 to return line 148, port 24 and return line 22. Solenoid valve SV1 is an off/on valve. As shown by FIG. 22, it includes a plug 310 and an orifice 312. When the plug 310 is retracted, as shown by FIG. 22, there is fluid communication from passageway 214, through orifice 314, then through orifice 312 and into passageway 148. When solenoid valve SV1 is in an open position (FIGS. 19, 20 and 22) the off/on valve O/OV may be operated by rotation of cam 152, as described above in connection with the first embodiment. When cam 152 is moved into the position shown by FIG. 12, there is fluid flow communication from passageway 144, through passageways 192, 190, 198, 206, 208 into passageway 214 (FIG. 12). When the off/on valve O/OV is in the position shown by FIG. 12, the solenoid valve SV1 can be used as a second control for the off/on valve O/OV. When valve O/OV is "open" and solenoid valve SV1 is "open" (FIG. 22), there is fluid return in the above named passageways from passageway 144 to passageway 148, port 24 and return line 22. However, when the plug 310 is extended, it closes flow through orifice 312. This stops the fluid return and allows a pressure build-up behind piston 182. Eventually, the pressure build-up will produce a force that in combination with the spring force will move the piston 182 from the position shown in FIG. 12 into the position shown in FIG. 13. This will move plug end 180 against valve seat 216 and block pressure flow through passageway 142. Thus, when the cam 152 is in the position show by FIG. 12, valve plug VP1 can be operated to open the shunt passageway 142, and turn the system off, by operating solenoid valve SV1 to retract the valve plug 310. Stated another way, when valve SV1 is open, valve O/OV is open and the system is "off." The operation of solenoid valve SV1 to extend the plug 310 into the orifice 312 will close first valve SV1, then on/off valve O/OV. Movement of plug end 180 against valve seat 216 will stop the shunting of pressure in passageway 144. Instead, the pressure will enter the system, turning the system "on."

A suitable solenoid valve to perform the function of SV1 is commercially available. It is a valve, model No. SV08-21-0-N-12D6 made by Hydra Force, Inc. located at 500 Barclay Blvd., Lincolnshire, Ill. 60069, U.S.A. A suitable commercially available valve to perform the function of solenoid valve SV2 is another valve that is available from Hydra Force, Inc. It is a four-way, two position spool valve, Model No. SV08-40-0N-12D6.

Figure 21:
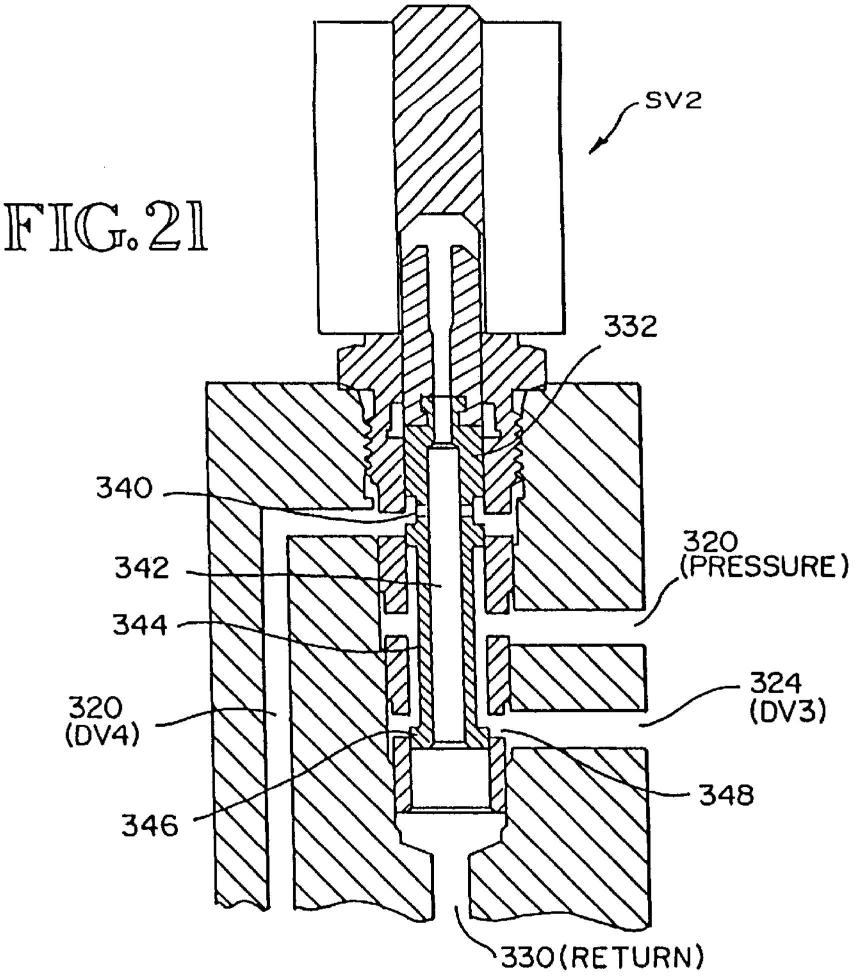
FIG. 21 is an enlarged scale fragmentary view of a first solenoid valve provided for patrolling the directional valve plug.

Referring to FIGS. 20 and 21, solenoid valve SV2 includes a port connected to a passageway 320 that leads from the valve SV2 to a fluid chamber behind valve plug 320 of direction valve DV4. A second port is connected to a passageway 324 that leads from the valve SV2 to a chamber behind valve plug 326 of directional valve DV3. A third port is connected to a passageway 328 that connects valve SV2 to pressure passageway 144. A fourth and final port connects to a passageway 330 that extends from SV2 to the return passageway 148 that in turn extends to port 24 and return line 22, leading to tank T. When solenoid valve SV2 is in the position shown by FIG. 21, the rear end of directional valve DV4 is connected to return via port 340 and passageway 342. The rear end of direction valve DV3 is connected to pressure via passageway 344. When the solenoid valve SV2 is operated to retract its valve plug 332, pressure passageway 328 is connected to the rear end direction valve DV4 via passageway 344. The rear end of direction valve DV3 is connected to return via a passageway that is formed when plug 346 moves above port 348. Thus, the use of solenoid valve SV2 in combination with the two poppet valves 322, 326 provides a way for remote operation of the conveying direction of the conveyor. For convenience, the control switches for the solenoid valves SV1 and SV2 can be located adjacent each other.

In other respects, the switching valve 102 and the drive units 12, 14, 16 function in the manner that is described above in connection with the first embodiment and FIGS. 1 and 2, in particular. Accordingly, the operation of switching valve 102 and the operation of drive units 12, 14, 16 will not be repeated.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. In a hydraulic system that includes a valve housing having a pressure port, a pressure passageway extending inwardly of the housing from the pressure port, a return port, and a return passageway extending from within the housing to the return port, an off/on valve, comprising:

a shunt passageway in said housing, extending between the pressure and return passageways;

a valve plug in said housing, movable into said shunt passageway, to close said shunt passageway, and movable out from said shunt passageway, to open said shunt passageway, whereby when the shunt passageway is closed, pressure in the pressure passageway will be connected to a region in the housing downstream of the shunt passageway, and when the shunt passageway is open, pressure in the pressure passageway will be shunted from the pressure passageway to and through the shunt passageway, to the return passageway and the return port;

wherein said valve housing includes a valve seat in the shunt passageway, generally where it meets the return passageway, and wherein said valve plug has a plug end facing the valve seat and an opposite rear end, and said valve plug is movable axially into and out from a closed position on said valve seat;

wherein said housing includes a cam cavity rearwardly of the valve plug, a cam in said cam cavity that is rotatable between first and second positions, said cam being operatively connected to the rear end of the valve plug and being adapted to permit rearward movement of the valve plug into its open position when the cam is in its first position, and movement of the cam from its first position to its second position imposes an axial force on the valve plug, moving the valve plug into its closed position;

wherein the valve plug includes an axial passageway, and wherein when the valve plug is seated and the cam is in its second position, pressure in the pressure passageway is connected by the axial passageway in the valve plug to a region rearwardly of the valve plug where at it exerts an axial force on the valve plug urging it towards a seated position;

wherein the cam includes a vent passageway that is blocked when the cam is in its second position and which connects the region rearwardly of the valve plug with return when the cam is in its first position; and wherein the housing includes a piston chamber between the rear end of the valve plug and the cam, and a piston in said piston chamber having a rear end that contacts the cam, and a compression spring positioned between the rear end of the valve plug and the piston.

2. A valve, comprising:

a housing;

a first passageway in said housing;

a second passageway in said housing that intersects the first passageway and includes a port and a valve seat at the intersection, said valve seat facing into the first passageway;

a valve plug in said housing extending generally crosswise of the first passageway and having a plug end directed towards the valve seat, and an opposite end;

wherein the valve plug is extendable to move its plug end into seating engagement with a valve seat, to close the valve port, and is retractable to move the valve plug away from the valve seat, to open communication between the first and second passageways;

wherein the valve plug is narrower than the first passageway, where it extends crosswise of the first passageway, so that the valve plug only partially blocks the first passageway, leaving a fluid avenue in the first passageway past the valve plug;

wherein said housing includes a cam cavity rearwardly at the opposite end of the valve plug, a cam in said cam cavity that is rotatable between first and second positions, said cam being operatively connected to the opposite end of the valve plug and being adapted to permit movement of the valve plug into its open position when the cam is in its first position, and wherein rotation of the cam from its first position to its second position imposes an axial force on the valve plug, urging the valve plug into a seated position;

wherein the valve plug includes an axial passageway, and wherein when pressure is in the second passageway it will be connected by the axial passageway to a region axially outwardly of the opposite end of the valve plug, said pressure exerting an axial force on the opposite end of the valve plug, urging the valve plug towards a seated position;

wherein the cam includes a vent passageway that is closed when the cam is in its second position and which connects the region outwardly of the opposite end of the valve plug with return when the cam is in its first position; and wherein the housing includes a piston chamber between the opposite end of the valve plug and the cam, and there is a piston in the piston chamber having an outer end that contacts the cam and an inner end, and wherein a compression spring is located between the outer end of the valve plug and the piston.

* * * * *